(12) United States Patent
Schulte, Jr. et al.

(10) Patent No.: US 6,443,310 B1
(45) Date of Patent: Sep. 3, 2002

(54) SEAL SCREEN STRUCTURE

(75) Inventors: David Lee Schulte, Jr., Broussard, LA (US); Thomas W. Adams, Hockley, TX (US); Kenneth W. Seyffert, Houston, TX (US); David W. Largent, Cleveland, TX (US); Guy L. McClung, III, Spring, TX (US); Jeffrey E. Walker, Lafayette, LA (US); Hector M. Murray, Aberdeen (GB)

(73) Assignee: Varco I/P, Inc., Houston, TX (US)

( * ) Notice: Subject to any disclaimer, the term of this patent is extended or adjusted under 35 U.S.C. 154(b) by 15 days.

(21) Appl. No.: 09/596,347

(22) Filed: Jun. 17, 2000

Related U.S. Application Data

(63) Continuation-in-part of application No. 09/544,572, filed on Apr. 6, 2000, now Pat. No. 6,283,302, which is a continuation-in-part of application No. 09/228,572, filed on Jan. 11, 1999, which is a continuation-in-part of application No. 09/183,005, filed on Oct. 30, 1998, which is a continuation-in-part of application No. 09/090,554, filed on Jun. 4, 1998, which is a continuation-in-part of application No. 08/895,976, filed on Jul. 17, 1997, now Pat. No. 5,988,397, which is a continuation-in-part of application No. 08/786,515, filed on Jan. 21, 1997, now Pat. No. 5,971,159, and a continuation-in-part of application No. 08/598,566, filed on Feb. 12, 1996, said application No. 08/786,515, is a continuation-in-part of application No. 29/014,575, filed on Oct. 25, 1993, now Pat. No. Des. 377,656, which is a continuation-in-part of application No. 29/014,571, filed on Oct. 25, 1993, now Pat. No. Des. 366,040, which is a continuation-in-part of application No. 08/105,696, filed on Aug. 12, 1993, now Pat. No. 5,392,925, and a continuation-in-part of application No. 08/056,123, filed on Apr. 30, 1993, now Pat. No. 5,385,669, said application No. 08/786,515, is a continuation-in-part of application No. 08/598,566, filed on Feb. 12, 1996, which is a continuation-in-part of application No. 08/220,101, filed on Mar. 30, 1994, now Pat. No. 5,490,598, said application No. 08/786,515, is a continuation-in-part of application No. 08/504,495, filed on Jul. 20, 1995, now Pat. No. 5,598,930, which is a continuation-in-part of application No. 08/220,101, filed on Mar. 30, 1994, now Pat. No. 5,490,598, said application No. 08/786,515, is a continuation-in-part of application No. 08/504,495, filed on Jul. 20, 1995, now Pat. No. 5,598,930.

(51) Int. Cl.$^7$ ................................. B07B 1/49
(52) U.S. Cl. .............. 209/399; 209/313; 209/403; 210/488
(58) Field of Search .................. 209/313, 314, 209/319, 397, 399, 403, 405, 408, 409; 210/389, 488, 490, 498, 499

(56) References Cited

U.S. PATENT DOCUMENTS 40,242 A 10/1863 Capell (List continued on next page.)

FOREIGN PATENT DOCUMENTS

DE 2912228 A 10/1980

(List continued on next page.)

OTHER PUBLICATIONS

Mud Equipment Manual Handbook 3: Shale Shakers, Brandt & Love, Gulf Pub. Co., 1982.

(List continued on next page.)

Primary Examiner—Tuan N. Nguyen
(74) Attorney, Agent, or Firm—Guy McClung

(57) ABSTRACT

A screen assembly for a vibratory separator, the screen assembly including a first screen assembly, a frame to which is mounted screening material, at least one seal member on the frame for sealing contact against a second screen assembly. A unibody structure for a first screen assembly for a vibratory separator, the unibody structure having an integral body member with a portion having a plurality of spaced-apart openings therethrough defining a pattern of a plurality of spaced-apart screening openings, the integral body member including side portions foldable to form a pair of spaced-apart integral side members, and at least one seal member on the integral body member for sealing contact of the unibody structure with another item.

16 Claims, 29 Drawing Sheets

U.S. PATENT DOCUMENTS

| | | | |
|---|---|---|---|
| 236,416 A | 1/1881 | Bourne | |
| 246,144 A | 8/1881 | Keeler | |
| 268,491 A | 12/1882 | Hubbell | |
| 275,190 A | 4/1883 | Gilbert | |
| 275,340 A | 4/1883 | Kimball | |
| 500,302 A | 6/1893 | Stoecket et al. | |
| 516,673 A | 3/1894 | Wilson | |
| 526,562 A | 9/1894 | Cross | |
| 560,858 A | 5/1896 | Missroon | |
| 583,981 A | 6/1897 | Plaisted | |
| 607,598 A | 7/1898 | Closz | |
| 777,317 A | 12/1904 | Traylor | |
| 865,185 A | 9/1907 | Kerrigan | |
| 948,222 A | 2/1910 | Honabach | |
| 964,897 A | 7/1910 | Bryant | |
| 966,578 A | 8/1910 | Murphy et al. | 209/401 X |
| 984,866 A | 2/1911 | Tate | |
| 1,082,612 A | 12/1913 | Smith et al. | |
| 1,098,979 A | 6/1914 | Schuchard | |
| 1,132,667 A | 3/1915 | Milliot | |
| 1,139,041 A | 5/1915 | Larson | |
| 1,242,982 A | 10/1917 | Reynolds | |
| 1,248,081 A | 11/1917 | Couch | |
| 1,250,768 A | 12/1917 | Baumgartner | 209/392 |
| 1,344,747 A | 6/1920 | Wright | |
| 1,359,426 A | 11/1920 | Plaisted | |
| 1,397,339 A | 11/1921 | Sturtevant | |
| 1,423,021 A | 7/1922 | Reynolds | |
| 1,462,804 A | 7/1923 | Evans | |
| 1,505,735 A | 8/1924 | Stebbins | |
| 1,561,632 A | 11/1925 | Woodward | |
| 1,626,774 A | 5/1927 | Allan | |
| 1,614,586 A | 10/1927 | Anderson et al. | |
| 1,678,941 A | 7/1928 | Helman | |
| 1,713,143 A | 5/1929 | Overstrom | |
| 1,716,758 A | 6/1929 | Bland | |
| 1,785,195 A | 12/1930 | Hoes et al. | |
| 1,822,298 A | 9/1931 | Kerrigan | |
| 1,879,377 A | 9/1932 | McNeely | |
| 1,950,861 A | 3/1934 | O'Toole Sr. | |
| 1,997,713 A | 4/1935 | Boehm | |
| 1,997,740 A | 4/1935 | Nickerson | |
| 2,052,467 A | 8/1936 | Hermann | 209/401 |
| 2,061,850 A | 11/1936 | Roberts | |
| 2,082,513 A | 6/1937 | Roberts | |
| 2,089,548 A | 8/1937 | Frantz et al. | |
| 2,104,785 A | 1/1938 | Akeyson | 210/384 |
| 2,190,262 A | 2/1940 | Geist | |
| 2,251,909 A | 8/1941 | Lindsay | 210/149 |
| 2,274,700 A | 3/1942 | Jenks | |
| 2,335,084 A | 11/1943 | Rice | 209/408 |
| 2,406,051 A | 8/1946 | Weiss | |
| 2,462,878 A | 3/1949 | Logue | |
| 2,480,320 A | 8/1949 | Carrier | 210/388 |
| 2,511,239 A | 6/1950 | Behnke et al. | 209/403 |
| 2,648,441 A | 8/1953 | Soldan | |
| 2,667,975 A | 2/1954 | Seaholm | 210/152 |
| 2,670,079 A | 5/1954 | Betts | 209/405 |
| 2,677,462 A | 5/1954 | Conkling | 209/403 |
| 2,723,032 A | 11/1955 | Gisler et al. | |
| 2,726,184 A | 12/1955 | Cox et al. | |
| 2,774,477 A | 12/1956 | Pollitz | 209/403 |
| 2,800,227 A | 7/1957 | Kiger | 209/412 X |
| 2,813,629 A | 11/1957 | Brugmann | 209/403 |
| 2,827,169 A | 3/1958 | Cusi | |
| 2,902,165 A | 9/1959 | Imershein | |
| 2,929,464 A | 3/1960 | Sprouse | |
| 2,973,865 A | 3/1961 | Cibula | 209/392 X |
| 2,980,208 A | 4/1961 | Neumann | |
| 2,985,303 A | 5/1961 | Wright | |
| 3,057,481 A | 10/1962 | Pale | 210/493 |
| 3,070,231 A | 12/1962 | McCorkel et al. | 209/319 |
| 3,092,573 A | 6/1963 | Lambert et al. | 209/403 |
| 3,165,473 A | 1/1965 | Pall et al. | 210/510 |
| 3,176,843 A | 4/1965 | Hoskins et al. | 209/403 |
| 3,243,943 A | 4/1966 | Getzin | 55/499 |
| 3,255,885 A | 6/1966 | Burls | 209/314 |
| 3,285,413 A | 11/1966 | Taylor-Smith | |
| 3,458,978 A | 8/1969 | Davis | 55/499 |
| 3,465,413 A | 9/1969 | Rosaen et al. | 29/428 |
| 3,542,636 A | 11/1970 | Wandel | 161/114 |
| 3,574,103 A | 4/1971 | Latkin | 428/72 |
| 3,655,060 A | 4/1972 | Hagdahl | 210/493 |
| 3,679,057 A | 7/1972 | Perez | 210/223 |
| 3,716,138 A | 2/1973 | Lumsden | 209/401 |
| 3,747,770 A | 7/1973 | Zentis | 210/402 |
| 3,747,772 A | 7/1973 | Brown | 210/493 |
| 3,789,498 A | 2/1974 | Cole | 29/470.9 |
| 3,793,692 A | 2/1974 | Tate et al. | 29/163.5 |
| 3,853,529 A | 12/1974 | Boothe et al. | 55/499 |
| 3,900,628 A | 8/1975 | Stewart | |
| 3,929,642 A | 12/1975 | Ennis et al. | 210/113 |
| 3,970,549 A | 7/1976 | Ennis et al. | 209/341 |
| 4,019,987 A | 4/1977 | Krashow | 210/232 |
| 4,022,596 A | 5/1977 | Pedersen | 55/528 |
| 4,033,865 A | 7/1977 | Derrick, Jr. | 209/275 |
| 4,062,769 A | 12/1977 | Simonson | 209/399 |
| 4,065,382 A | 12/1977 | Derrick, Jr. | 209/313 |
| 4,075,106 A | 2/1978 | Yamazaki | 210/487 |
| 4,138,303 A | 2/1979 | Taylor | 156/264 |
| 4,380,494 A | 4/1983 | Wilson | 209/319 |
| 4,410,427 A | 10/1983 | Wydeven | 210/317 |
| 4,464,242 A | 8/1984 | Boulton | 204/253 |
| 4,472,473 A | 9/1984 | Davis et al. | 428/184 |
| 4,546,783 A | 10/1985 | Lott | 134/109 |
| 4,575,421 A | 3/1986 | Derrick et al. | 209/397 |
| 4,582,597 A | 4/1986 | Huber | 204/313 |
| 4,589,983 A | 5/1986 | Wydevan | 210/317 |
| 4,617,122 A | 10/1986 | Kruse et al. | 210/493.3 |
| 4,634,535 A | 1/1987 | Lott | 210/780 |
| 4,678,578 A | 7/1987 | Nodes et al. | 210/445 |
| 4,696,751 A | 9/1987 | Eifling | 210/780 |
| 4,728,422 A | 3/1988 | Bailey | 210/314 |
| 4,769,968 A | 9/1988 | Davis et al. | 52/814 |
| 4,819,809 A | 4/1989 | Derrick | 209/275 |
| 4,820,407 A | 4/1989 | Lilie | 209/397 |
| 4,832,834 A | 5/1989 | Baird, Jr. | 209/397 |
| 4,857,176 A | 8/1989 | Derrick et al. | 209/392 |
| 4,882,044 A | 11/1989 | Friessle | 209/319 |
| 4,882,054 A | 11/1989 | Derrick et al. | 210/389 |
| 4,892,767 A | 1/1990 | Freissle | 428/52 |
| 4,940,500 A | 7/1990 | Tadokoro et al. | 156/204 |
| 4,954,249 A | 9/1990 | Gero et al. | 209/273 |
| 5,028,474 A | 7/1991 | Czaplicki | 428/178 |
| 5,056,286 A | 10/1991 | Bokor | 52/483 |
| 5,084,178 A | 1/1992 | Miller et al. | 210/493.5 |
| 5,137,622 A | 8/1992 | Souter | 209/403 |
| 5,139,154 A | 8/1992 | Gero et al. | 209/273 |
| 5,162,143 A | 11/1992 | Porter et al. | 428/179 |
| 5,167,740 A | 12/1992 | Michaelis et al. | 156/73.1 |
| 5,211,291 A | 5/1993 | Kelley et al. | 209/680 |
| 5,221,008 A | 6/1993 | Derrick, Jr. et al. | 209/269 |
| 5,256,292 A | 10/1993 | Cagle | 210/499 |
| 5,312,508 A | 5/1994 | Chisholm | 156/292 |
| 5,330,057 A | 7/1994 | Schiller et al. | 209/392 |
| 5,385,669 A | 1/1995 | Leone, Sr. | 210/488 |
| 5,392,925 A | 2/1995 | Seyffert | 209/405 |
| 5,417,793 A | 5/1995 | Bakula | 156/308.2 |
| 5,417,858 A | 5/1995 | Derrick et al. | 210/388 |
| 5,417,859 A | 5/1995 | Bakula | 210/388 |
| H1481 H | 9/1995 | Ray | 428/98 |

| | | | |
|---|---|---|---|
| 5,490,598 A | 2/1996 | Adams | 209/403 X |
| 5,614,094 A | 3/1997 | Deister et al. | 210/388 |
| 5,636,749 A | 6/1997 | Wojciechowski | 209/403 |
| 5,720,881 A | 2/1998 | Derrick et al. | 210/388 |
| 5,783,077 A | 7/1998 | Bakula | 210/388 |
| 5,814,218 A | 9/1998 | Cagle | 210/388 |
| 5,819,952 A * | 10/1998 | Cook et al. | 209/401 X |
| 5,851,393 A | 12/1998 | Carr et al. | 204/489 |
| 5,868,929 A | 2/1999 | Derrick et al. | 210/388 |
| 5,876,552 A | 3/1999 | Bakula | 156/308.2 |
| 5,921,399 A | 7/1999 | Bakula et al. | 209/272 |
| 5,944,993 A | 8/1999 | Derrick et al. | 210/388 |
| 5,950,841 A | 9/1999 | Knox et al. | 209/315 |
| 5,958,236 A | 9/1999 | Bakula | 210/388 |
| 5,967,336 A | 10/1999 | Baltzer et al. | 209/403 |
| 5,984,107 A | 11/1999 | Bleh | 209/320 |
| 5,992,641 A | 11/1999 | Caldwell, Jr. | 209/273 |
| 6,000,556 A | 12/1999 | Bakula | 210/388 |
| 6,000,558 A | 12/1999 | Proulx et al. | 210/486 |
| 6,006,923 A | 12/1999 | Helmy et al. | 209/397 |
| 6,019,228 A | 2/2000 | Duggan | 209/408 |
| 6,053,331 A | 4/2000 | Cravello | 210/388 |
| 6,053,332 A | 4/2000 | Bakula | 210/388 |

FOREIGN PATENT DOCUMENTS

| | | | |
|---|---|---|---|
| DE | 3827259 A | 4/1989 | |
| DE | 8904477 U | 11/1989 | |
| GB | 269877 | 4/1928 | |
| GB | 519680 | 6/1939 | |
| GB | 823648 | 10/1957 | |
| GB | 1412975 | 11/1975 | |
| GB | 2124099 A | 2/1984 | |
| GB | 2161715 A | 1/1986 | |
| GB | 2206501 A | 7/1987 | B01D/25/02 |
| GB | 2161715 B | 6/1988 | |
| JP | 59-142818 | 8/1984 | |
| WO | WO 84/02290 | 6/1984 | B07B/1/46 |
| WO | PCT/GB91/00957 | 6/1991 | |
| WO | WO 9200133 A | 1/1992 | |
| WO | PCT/US94/00243 | 1/1994 | |
| WO | WO 9415723 A | 7/1994 | |
| WO | PCT/EP96/03103 | 2/1996 | |
| WO | WO 96/04060 | 2/1996 | B01D/29/01 |
| WO | WO 9611070 A | 4/1996 | |
| WO | WO 96/11070 | 4/1996 | B07B/1/46 |
| WO | WO 9703765 A | 2/1997 | |
| WO | WO 9523655 A | 9/1998 | |
| WO | WO 98/37988 | 9/1998 | B07B/1/46 |
| WO | WO 01/76719 | 10/2001 | B01D/33/00 |

OTHER PUBLICATIONS

An Innovative Method of ranking Shale Shaker Screens, STCO5, Shale Shaker Technology Conference, Feb. 1991.
Int'l Search Report, PCT/GB01/02000, PCT Counterpart of present case.
U.S. Application S.N. 08/282,983, filed Jul. 29, 1994 entitled "Shale Shaker Screens," co-owned with present invention/application.
"Derrick Sandwich Shaker," Derrick Equipment Co. (Prior to 1992).
"The Future of Fine Screening," Derrick Equipment Co. 1993.
"Derrick Pyramid Screens," Derrick Corp.
"Advanced Wirecloth, Inc.," Advanced Wirecloth, Inc., 1993.
"CPI Group, Inc.," Inc., 1990.
"LM3 Full–Flo ™ Shale Shaker," Sweco Oilfield Services, 1991.
Pending U.S. Application 08/220,101 filed Mar. 30, 1994 entitled "Screen For Vibrating Separator".
Amendment Under 37 CFR 1.115 in pending U.S. Ser. No. 08/220,101.
Offical Gazette Entry for U.S. Patent 5,626,234, May 6, 1997.
The Brandt Company General Catalog 1982–1983, 4 pages, 1982.
Take the Drilled Solids Out, The Brandt Company, Sep. 1980.
Sweco Full–Flow, Sweco, Inc. 1992.
Catalog 105 H&K Perforated Materials, Harrington & King–Perforating Co., 1988.
Sweco Oilfield Services, Composite Catalog, 1992.
Screening Equipment Handbook, Pankratz, 1988.
Supertaut Mud Cleaner Screens, Sweco Oilfield Services, 1992.
Filtration & Seperation, Flo Trend Systems, Inc. 1989.
Clean Liquids/Dry Solids, Flo Trend Systems, Inc. 1989.
Mcnally Coal Preparation Manual M 576, pp. 111, 73–96, 216 (1978).
Layered Shale Shaker Screens Improved Mud Solids Control, World Oil, 1978.
Int'l Search Report, PCT/GB97/00385 co-owned with present application.

* cited by examiner

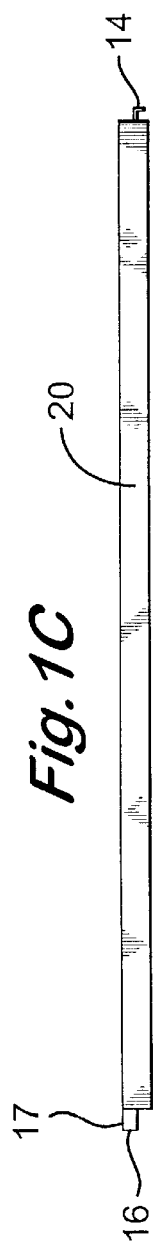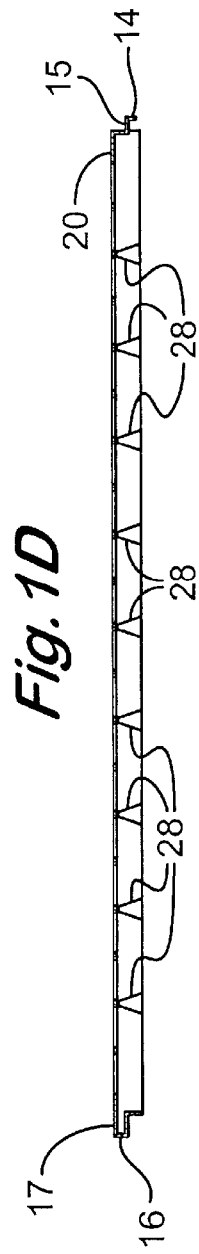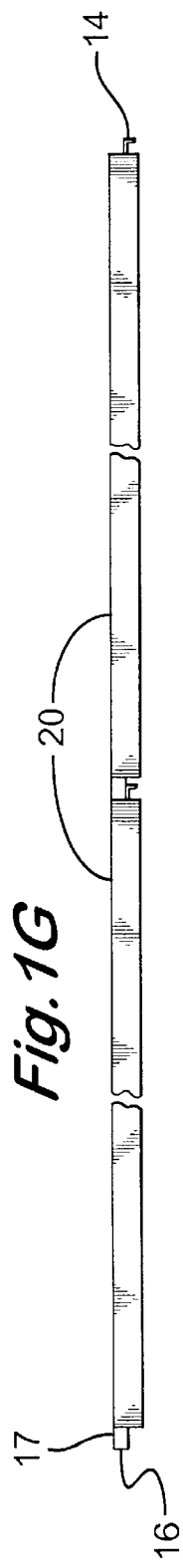

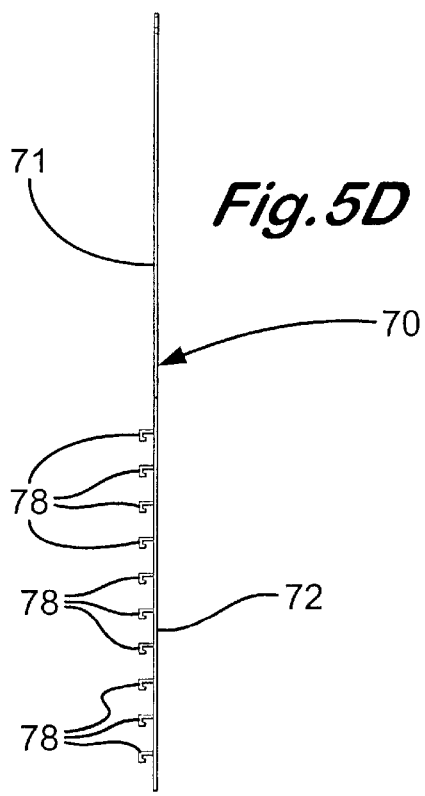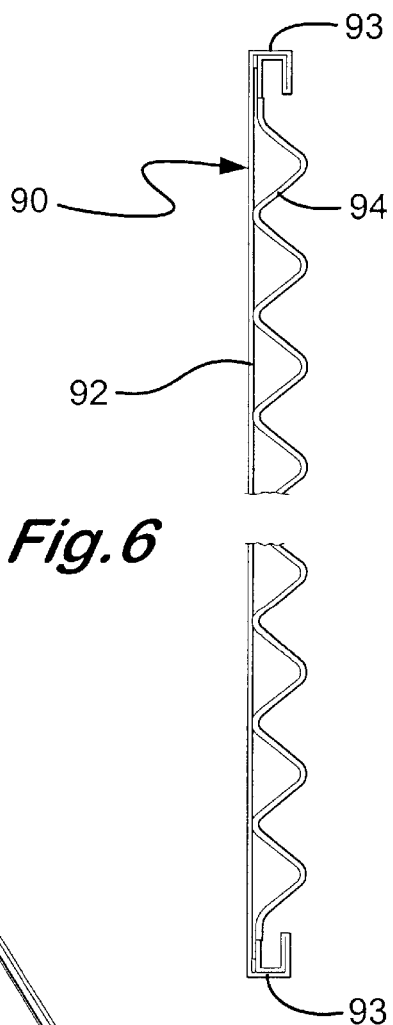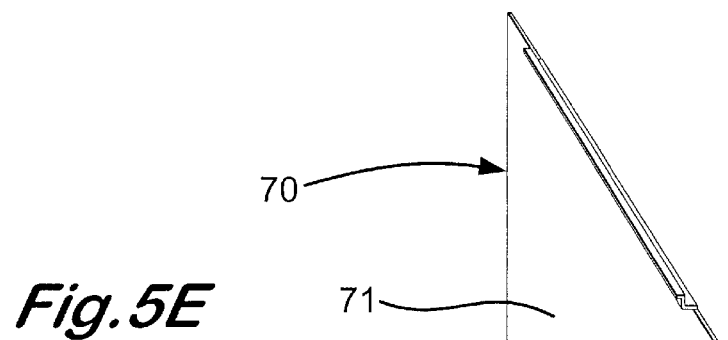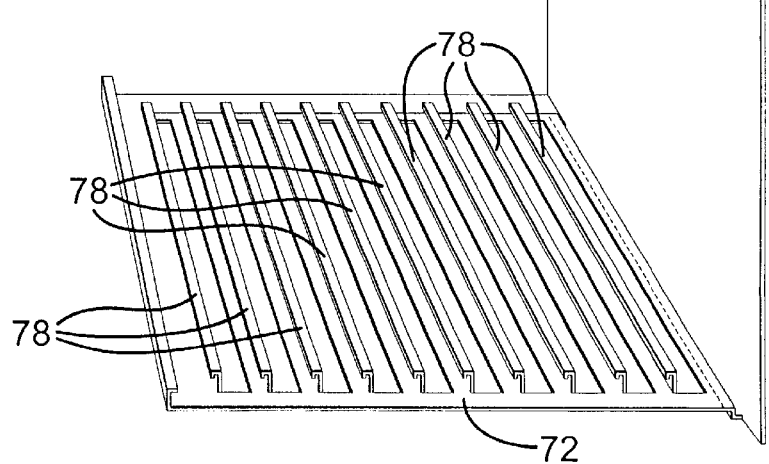

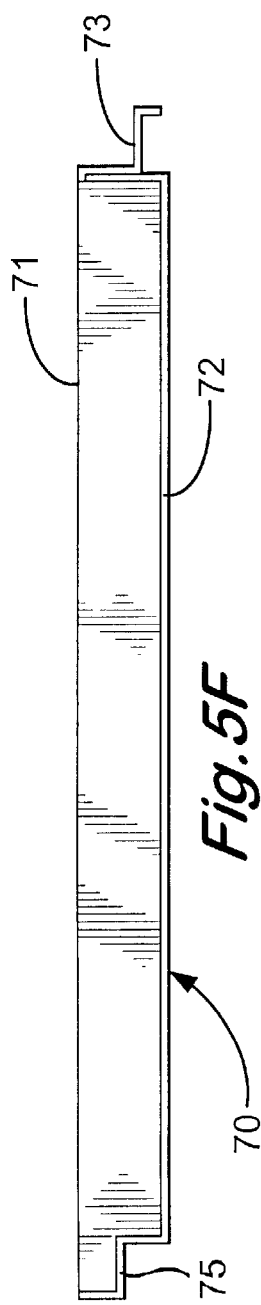
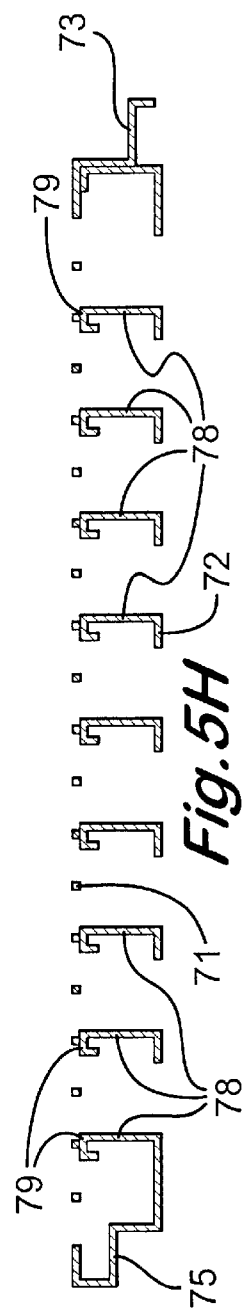
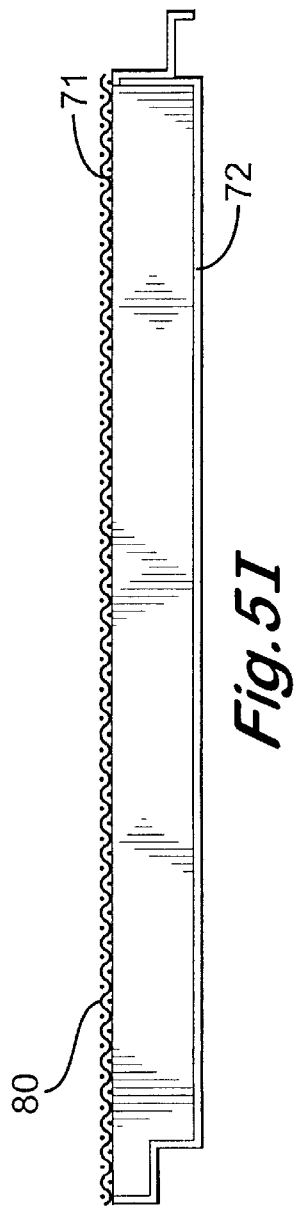
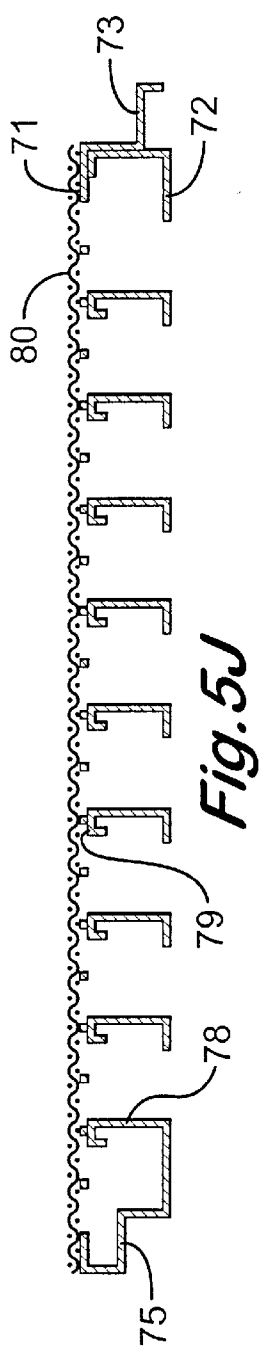

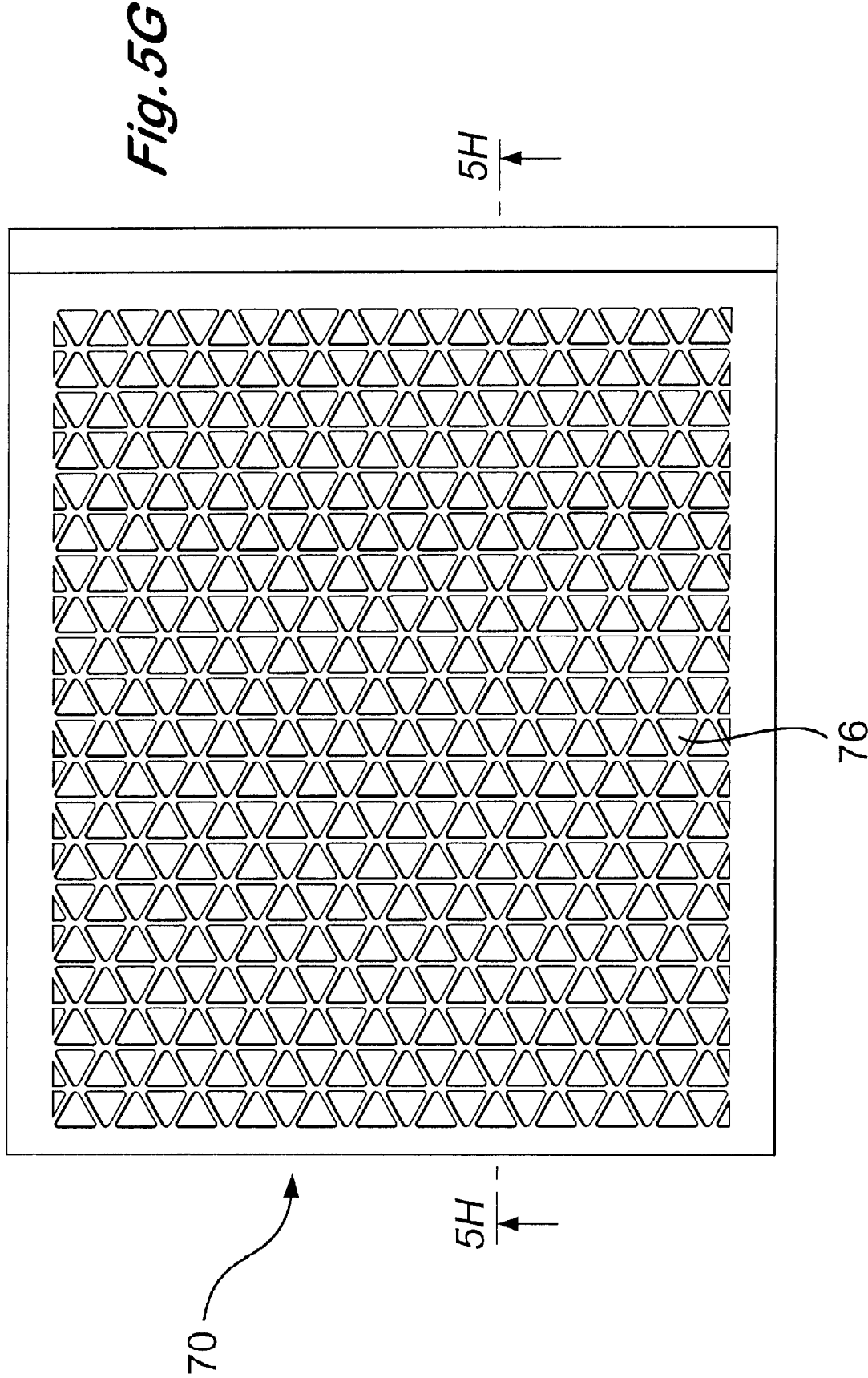

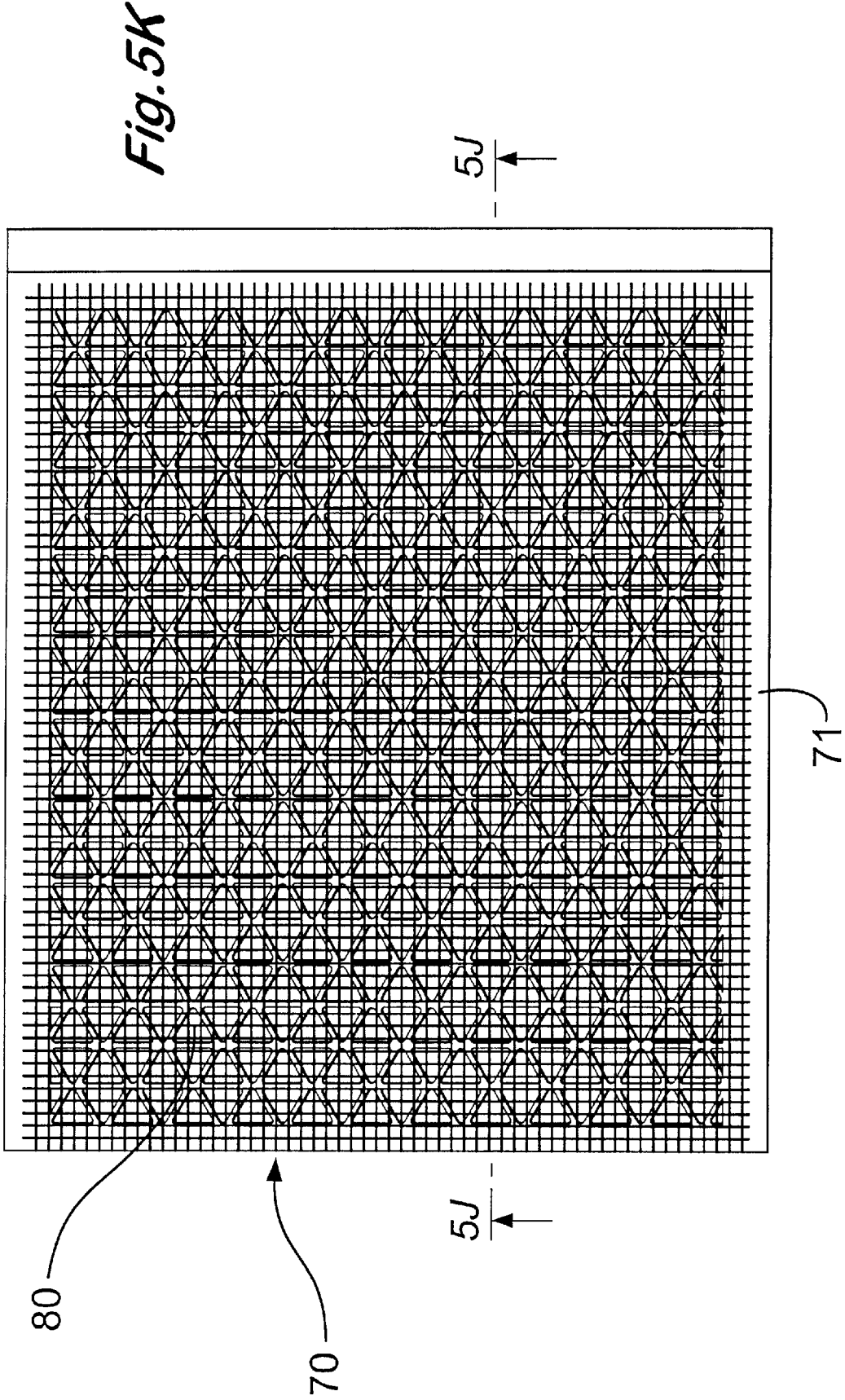

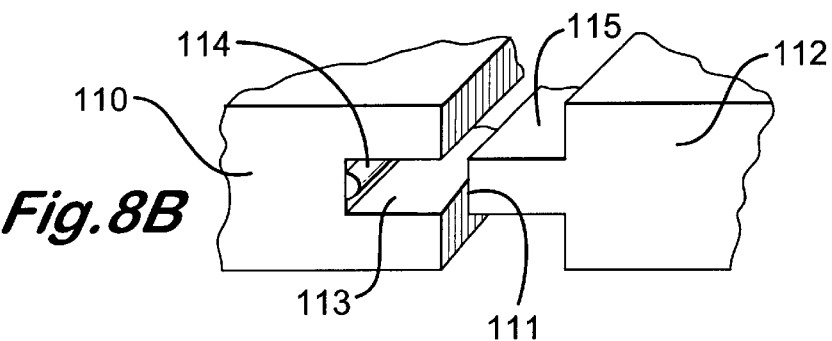
Fig.8B
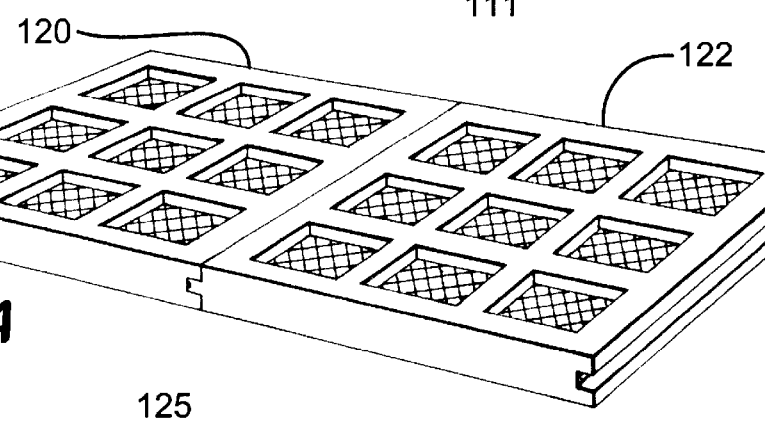
Fig.9A
Fig.9B
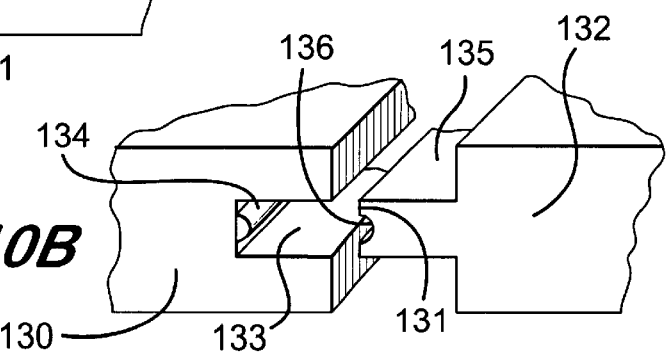
Fig.10B
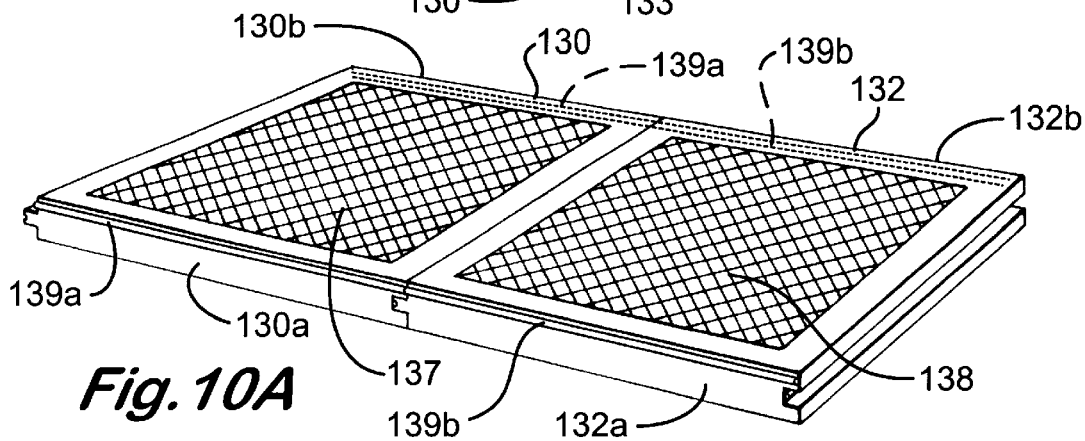
Fig.10A

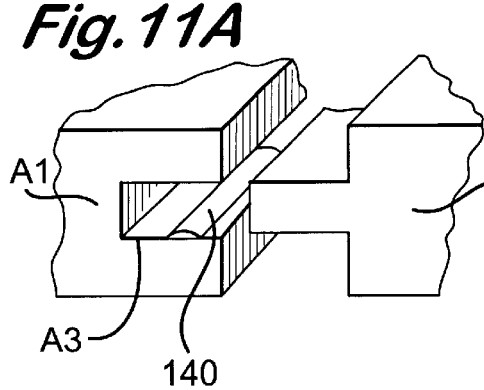
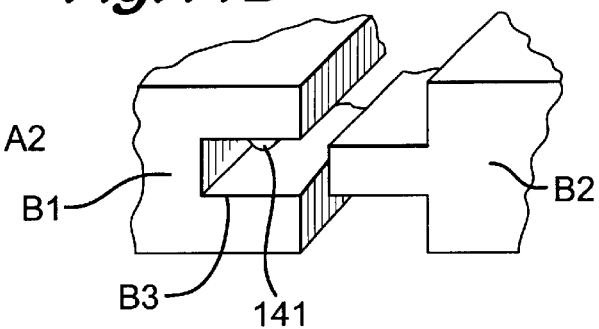
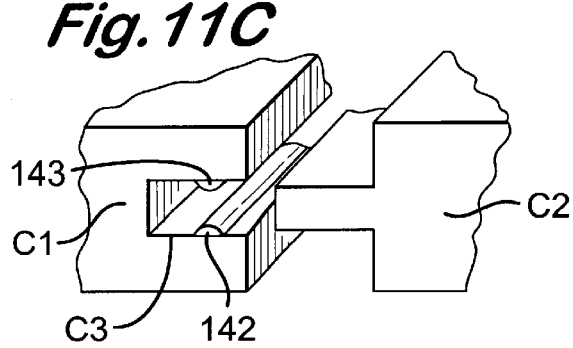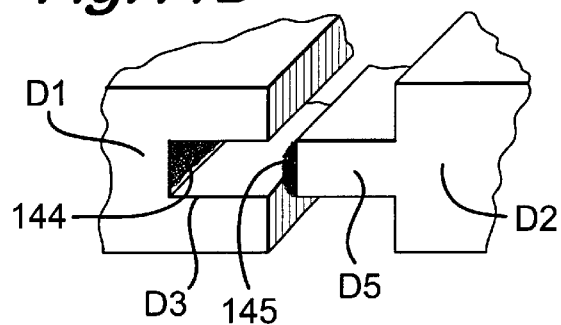
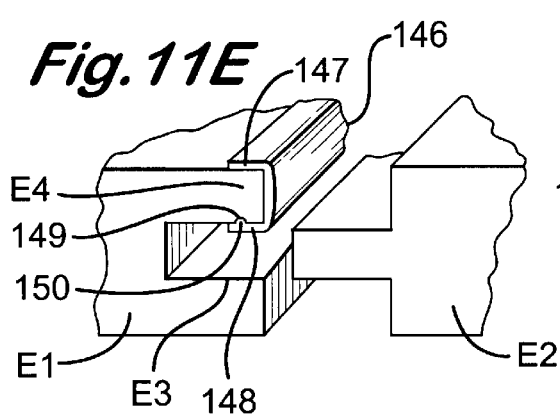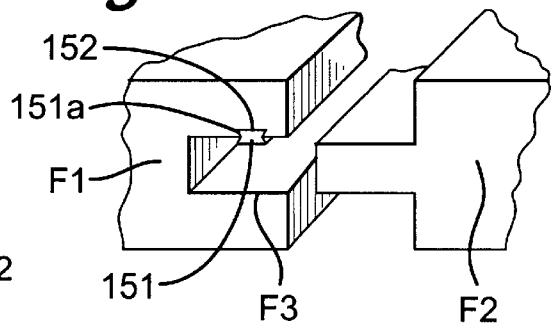
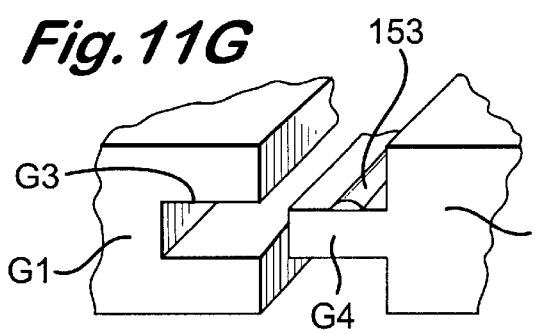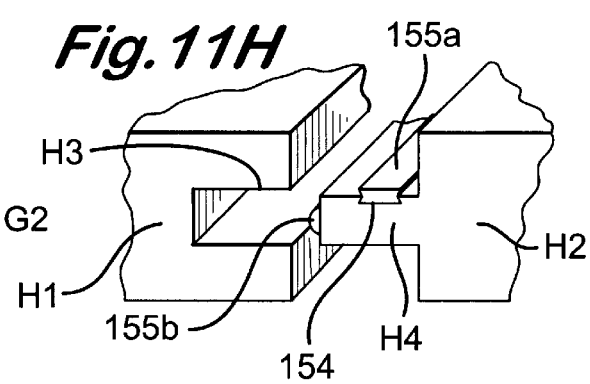

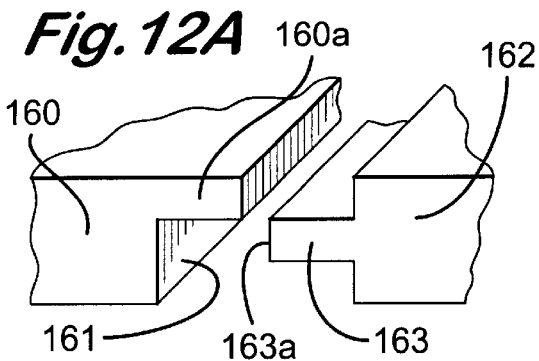
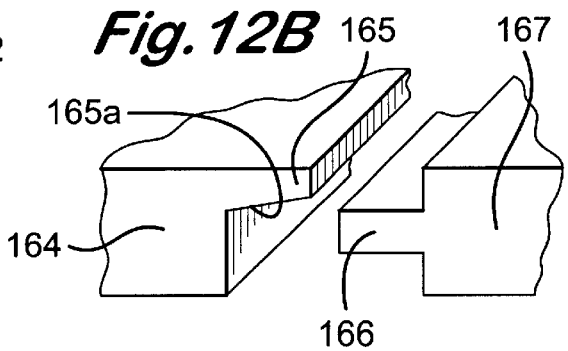
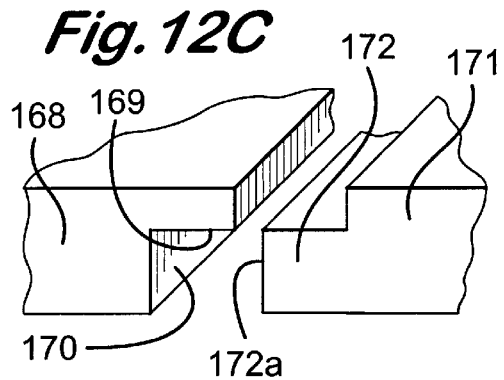
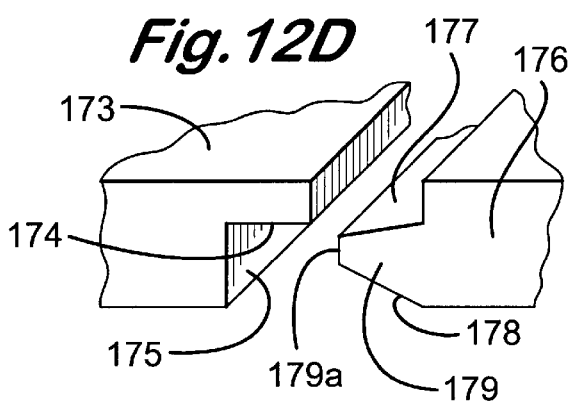
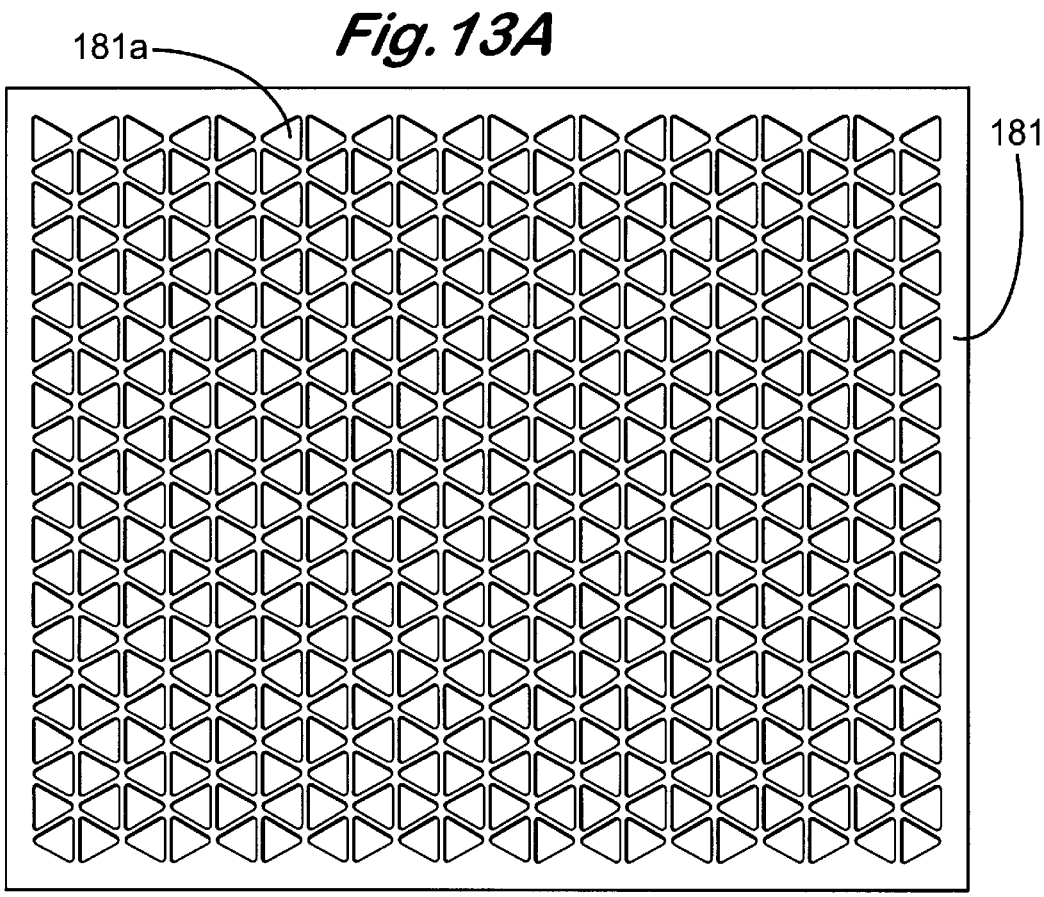

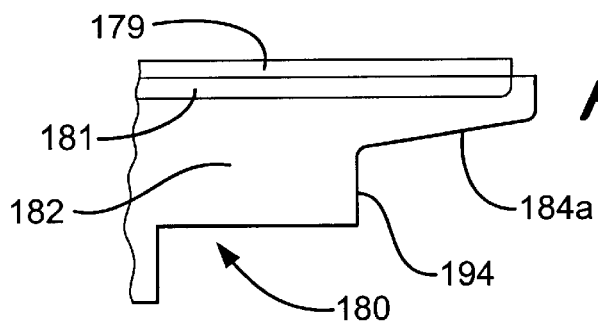
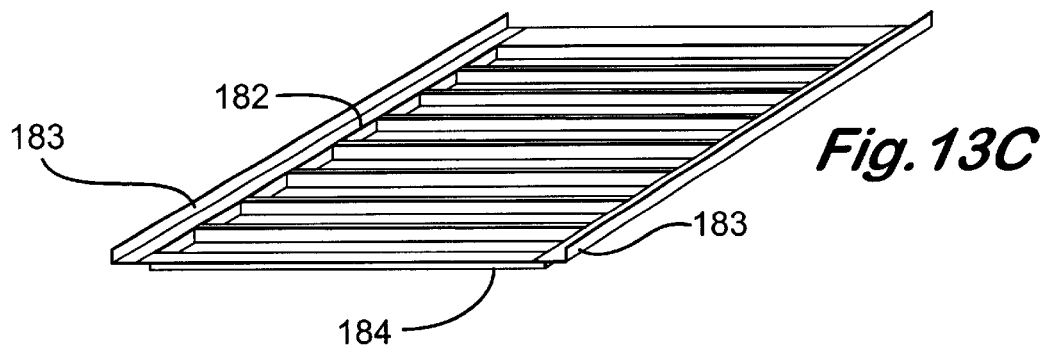
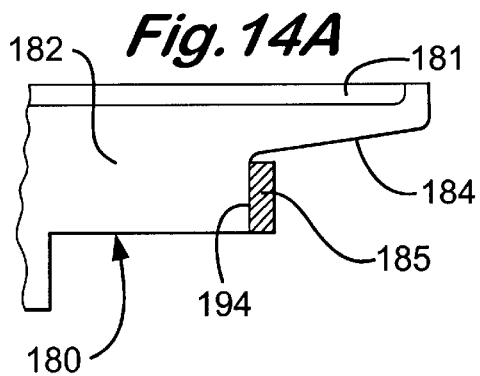
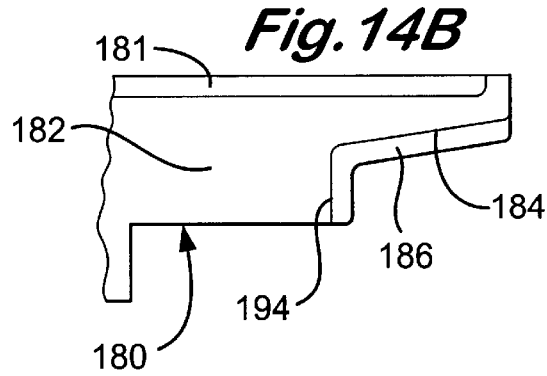
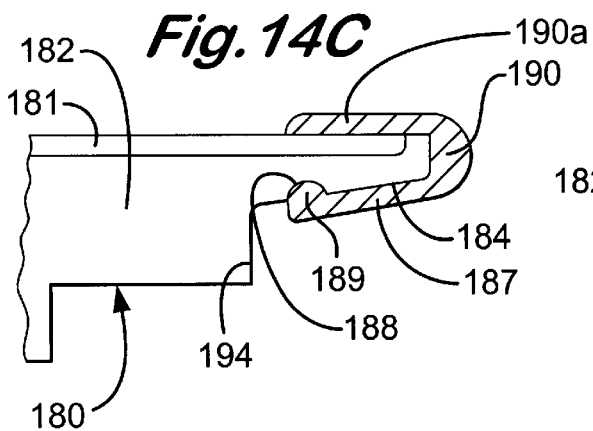
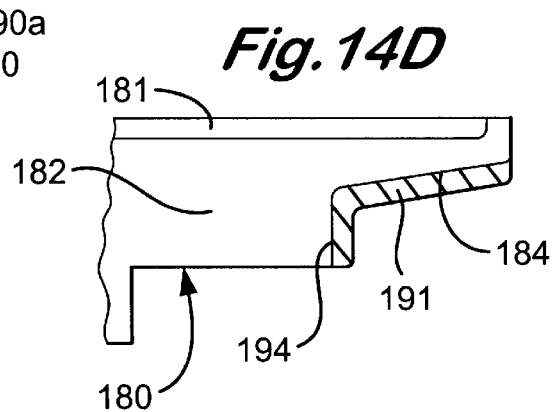

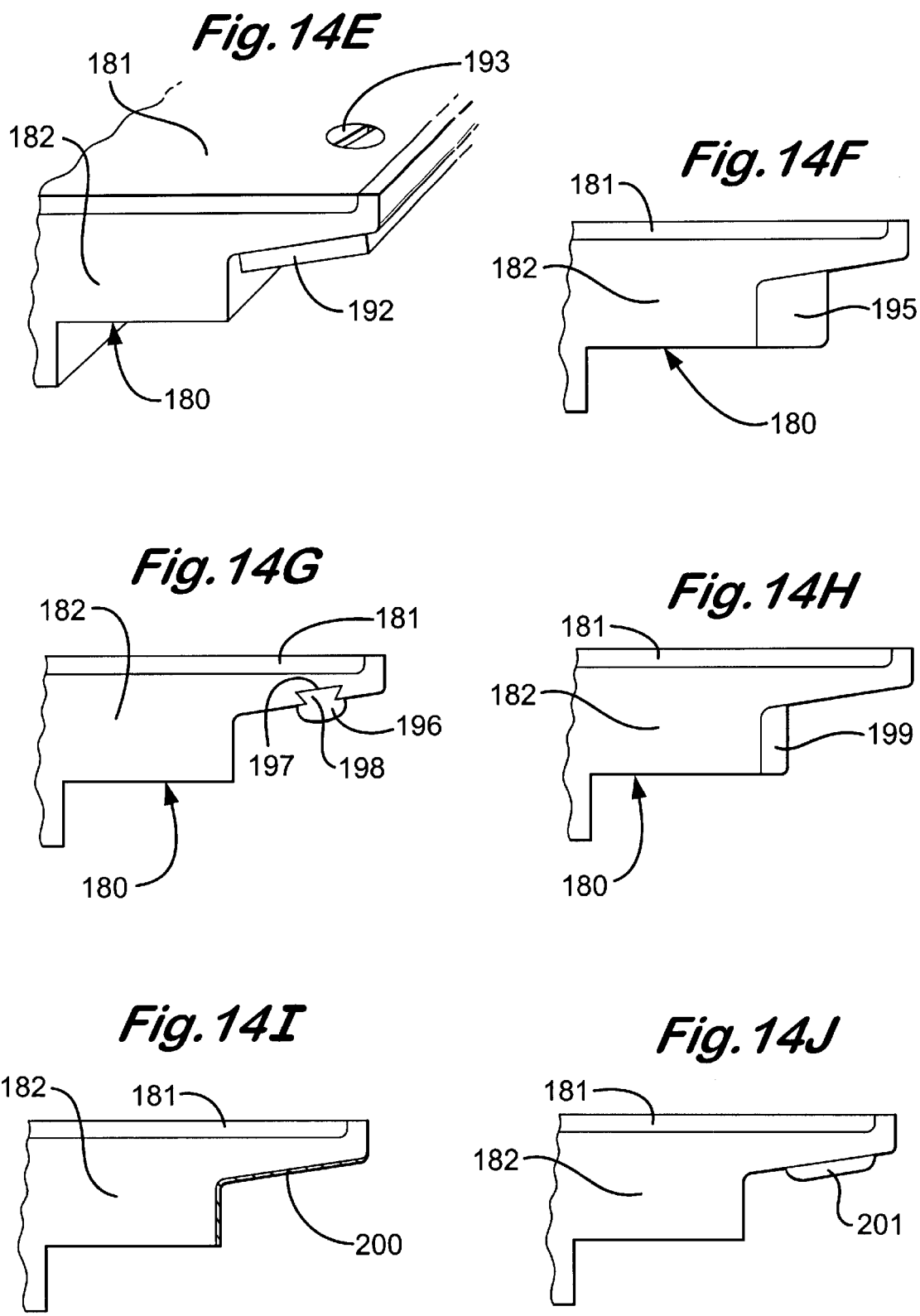

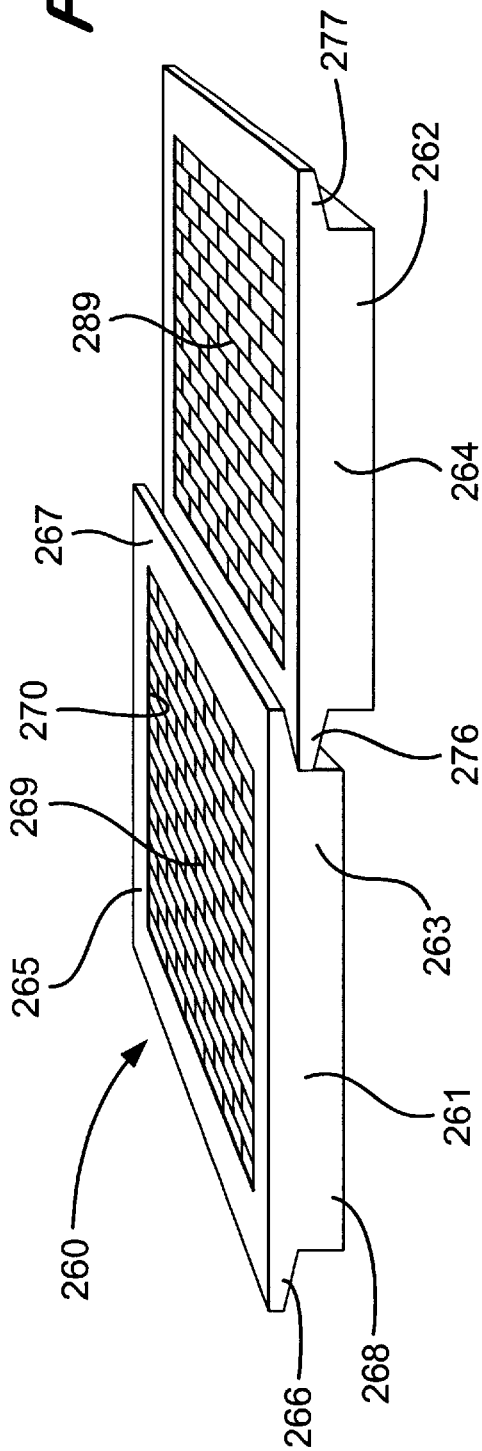
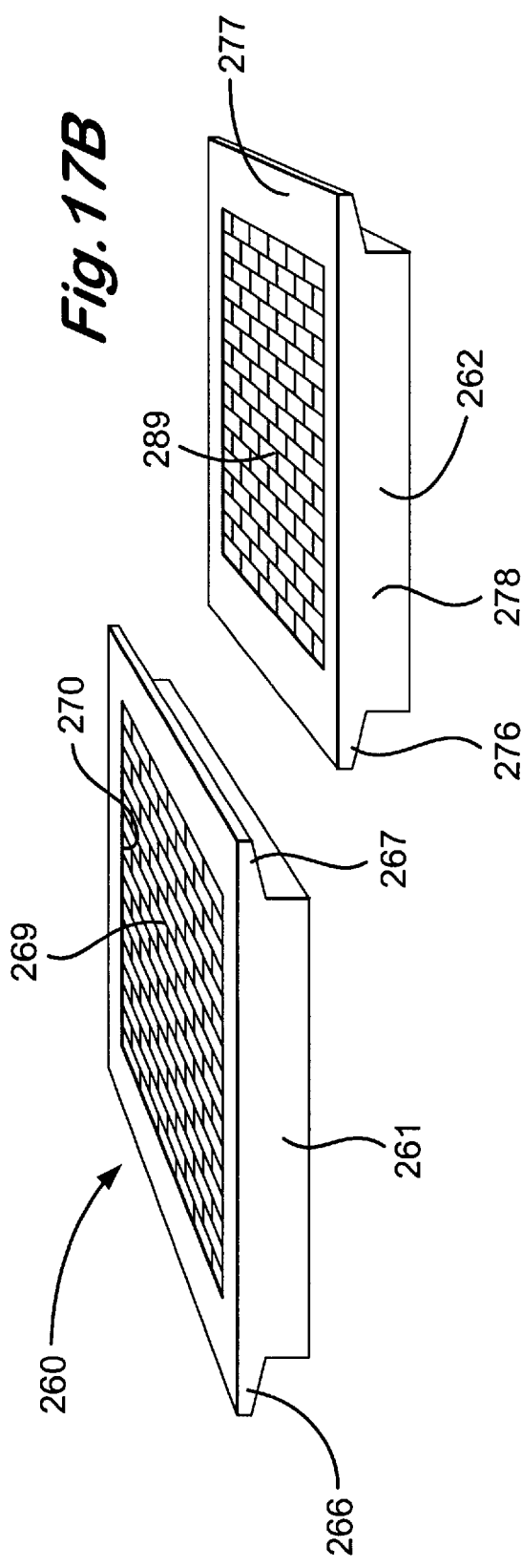

SEAL SCREEN STRUCTURE

RELATED APPLICATIONS

This is a continuation-in-part of U.S. application Ser. No. 09/544,572 filed Apr. 6, 2000, now U.S. Pat. No. 6,283,302 "Unibody Screen Structure " which is a continuation-in-part of U.S. application Ser. No. 09/288,572 filed Jan. 11, 1999 which is a continuation-in-part of U.S. application Ser. No. 09/183,005 filed Oct. 30, 1998, which is a continuation-in-part of U.S. application Ser. No. 09/090,554 filed Jun. 4, 1998 entitled "Vibratory Separator Screen " which is a continuation-in-part of U.S. application Ser. No. 08/895,976 filed Jul. 17, 1997 entitled "Screen For Vibratory Shaker" issued as a U.S. Pat. No. 5,988,397 on Nov. 23, 1999 which is a continuation-in-part of U.S. application Ser. No. 08/786,515 filed Jan. 21 1997 entitled "Screen For Shale Shaker" issued as U.S. Pat. No. 5,971,159 on Oct. 26, 1996 and of U.S. application Ser. No. 08/598,566 filed Feb. 12, 1996 entitled "Screen For Vibrating Separator." U.S. application Ser. No. 08/786,515 is a continuation in part of the following co-owned applications and patents: U.S. Ser. No. 29/048,575 filed Jan. 4, 1996, now U.S. Pat. No. D 377,656 issued Jan. 28, 1997 which is a continuation of U.S. Ser. No. 29/014,571, filed Oct. 25, 1993, now U.S. Pat. No. D 366,040 issued on Jan. 9, 1996 which is a continuation-in-part of U.S. applications: Ser. No. 08/056,123 filed Apr. 30, 1993, now U.S. Pat. No. 5,385,669 issued on Jan. 31, 1995; and Ser. No. 08/105,696 filed Aug. 12, 1993, now U.S. Pat. No. 5,392,925 issued Feb. 28, 1995; U.S. Ser. No. 08/504,495 filed Jul. 20, 1995 entitled "Shale Shaker Screen" issued as U.S. Pat. No. 5,598,930 in Feb. 4, 1997; U.S. Ser. No. 08/598,566 filed Feb. 12, 1996 entitled "Screen For Vibrating Separator" which is a continuation-in-part of U.S. Ser. No. 08/220/101 filed Mar. 30, 1994 now U.S. Pat. No. 5,490,598 issued Feb. 13, 1996. All of these related applications and patents are incorporated herein in their entirety for all purposes.

BACKGROUND OF THE INVENTION

1. Field of the Invention

The present invention is directed to frames, support structures, and screen assemblies for vibratory shakers and methods of their use.

2. Description of Related Art

The prior art discloses a wide variety of vibrating screens, devices which use them, shale shakers, and screens for shale shakers and vibratory separators. The screens catch and remove entrained solids from fluid, drilling fluid, and/or drilling mud as it passes through them.

Various prior art screens have one, two or more overlying layers of screening material, mesh, and/or screen cloth which may be bonded together. A support, supports, or a perforated or apertured plate is often used beneath the screen, mesh or screens of many prior art screen assemblies. Also an outer frame is used in many screens. The frame may include one or more crossmembers extending across the frame and connected at the ends to sides of the frame. The frame facilitates connection of the screen to a separator device and provides support for the plate and screening material. various vibratory separators have two or more screens mounted against each other, e.g. end-to-end, in abutting relationship.

SUMMARY OF THE PRESENT INVENTION

The present invention, in certain aspects, provides a screen assembly for a vibratory separator apparatus that has a frame or outer member or members with a seal or gasket material for sealing abutment of the screen assembly against another adjacent screen assembly and/or against a channel or side member of a basket or shaker apparatus on or in which the screen assembly is employed. In one particular aspect hook-and-loop releasable connection material is used on two adjacent screens to releasably connect them together or on a screen.

The present invention, in certain embodiments, provides a screen assembly with a groove and a seal on the groove, the groove for sealingly receiving a corresponding tongue of an adjacent screen assembly. In other aspects the groove is deleted and a surface of a first screen assembly has a seal or gasket member against which sealingly abuts a tongue or member of a second screen assembly. Hook-and-loop releasable connection material may, optionally, be used with such screens to releasably secure them together.

In certain particular embodiments of a screen assembly according to the present invention, a unibody structure includes one, two, or more seals or gaskets thereon so that the final structure formed from a starting single piece includes the seal(s) or gasket(s).

The present invention discloses, in certain embodiments, a unibody structure for a screen for a vibratory separator and a screen assembly with such a structure. In certain aspects, the unibody structure is made from a single piece of material and a pattern of openings is made through it that perform a screening function. Such a structure may have no additional screening material on it or it may serve as a support for mesh and/or screening material—without, in some aspects, the need for additional screen support, an additional support plate, or an additional series of support pieces or strips. In certain embodiments the single piece of material includes portions that are foldable or bendable to form hook strips and/or a shoulder or ledge end for sealing end-to-end abutment of two screens and/or support ribs for supporting another portion in which there is a pattern of openings. In another aspect the unibody structure is foldable or bendable to form a single large opening defined by four resulting sides of the unibody structure.

In certain embodiments, the screen with a unibody structure according to the present invention has one, two, three or more upper layers of screen, screen cloth, and/or mesh. The one or more layers may be bonded to the unibody structure. If more than one layer is used, they may be bonded together at discrete points, at discrete areas, or over their entire surface. The layer or layers are mounted on the unibody structure. The unibody structure may, in certain aspects, include one or two interconnected pairs of spaced-apart integral sides in a generally rectangular configuration. Hook strips or other mounting structure may be provided on opposed sides of a unibody structure according to the present invention which are formed of integral portions of the original single piece of material.

The unibody structure may be made of any suitable plastic or metal, including, but not limited to, steel, stainless steel, aluminum, aluminum alloys, zinc, zinc alloys, PTFE, or some combination thereof.

The present invention, in certain embodiments includes a shale shaker or vibratory separator with one or more screen assemblies with a unibody structure according to the present invention.

It is within the scope of this invention to provide a screen as disclosed in U.S. Pat. Nos. 6,000,556; 5,958,236; 5,944,993; 5,876,552; 5,888,929; 5,713,077; 5,720,881; 5,673,797; 5,417,793; 5,417,858; and 5,417,859, but to delete the apertured plate of these patents and to use instead a unibody structure as disclosed herein.

In certain aspects according to the present invention, a single piece of material is used to form a four-sided support or frame for screening material (one, two, three or more layers) and/or for a plate or sheet with holes therethrough.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, non-obvious screen frames, assemblies or supports for vibratory separators with a seal or seals for sealing abutment of one screen against the other and/or for sealing abutment of a screen against a basket or screen mounting apparatus, and methods of their use;

Such screen assemblies with hook-and-loop releasable connecting material for releasably connecting screens together;

Such screen assemblies made for unibody structure; and

Such frames, assemblies, or supports employing a groove on one screen and a corresponding tongue on an adjacent screen.

Certain embodiments of this invention are not limited to any particular individual feature disclosed here, but include combinations of them distinguished from the prior art in their structures and functions. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods.

The present invention recognizes and addresses the previously mentioned problems and long-felt needs and provides a solution to those problems and a satisfactory meeting of those needs. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1C is a side view of the screen assembly part shown in FIG. 1B. FIG. 1D is a cross-section view along line 1D—1D of FIG. 1B. FIG. 1G shows two screens as in FIG. 1D end-to-end.

FIG. 5D is a side view of the material of FIG. 5C with support ribs now projecting from the material. FIG. 5E shows the material of FIG. 5D with the portion with the pattern of openings at an angle with respect to the portion with the support ribs. FIG. 5F shows the piece of material with part folded or bend over onto the other part. FIG. 5G is a top view of the piece of material of FIG. 5F and FIG. 5H is a view along line 5H—5H of FIG. 5G. FIGS. 5I (side view), 5J (cross-section view along line 5J—5J of FIG. 5K) and 5K (top view), show screening material on the piece of material of FIG. 5H. FIG. 6 is a side cross-section view of a screen assembly according to the present invention.

FIG. 8B is an enlargement of part of the screen assembly of FIG. 8A.

FIG. 9A is a perspective view of a screen assembly according to the present invention. FIG. 9B is an enlarged view of part of the screen assembly of FIG. 9A.

FIG. 10A is a perspective view of a screen assembly according to the present invention. FIG. 10B is an enlarged view of part of the screen assembly of FIG. 10A.

FIG. 11A–11H are partial perspective views of parts of screen assemblies according to the present invention.

FIG. 12A–12D are partial perspective views of parts of screen assemblies according to the present invention.

FIG. 13A is a top view of a screen assembly according to the present invention. FIG. 13B is a cross-section view of an end of the screen assembly of FIG. 13B. FIG. 13C is a perspective view of a frame of the screen assembly of FIG. 13A.

FIG. 17A is a perspective view of a screen combination according to the present invention. FIG. 17B is an exploded view of the screen combination of FIG. 17A.

DESCRIPTION OF EMBODIMENTS PREFERRED AT THE TIME OF FILING FOR THIS PATENT

Figure 1A:
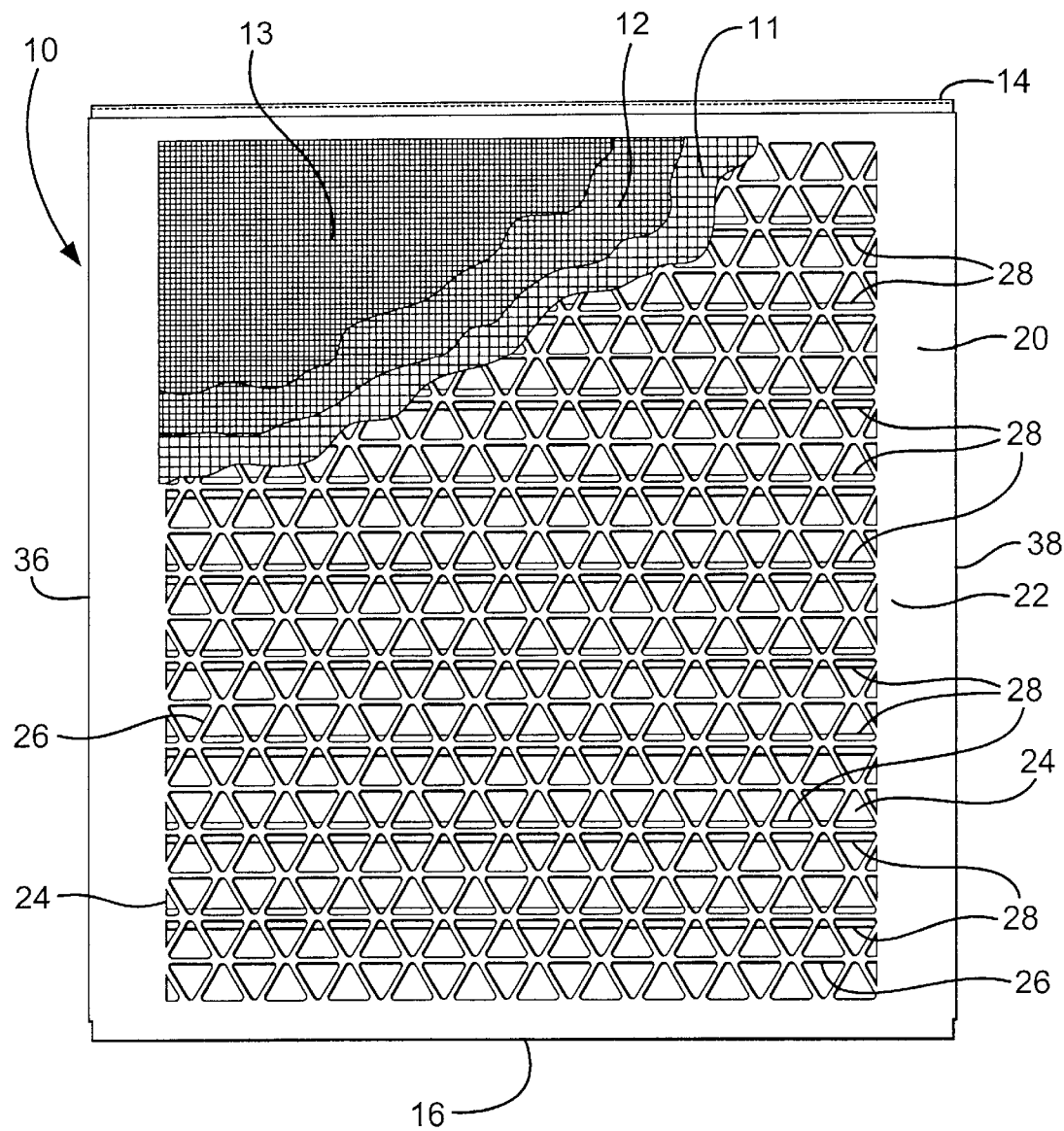
FIG. 1A is a top view of a screen assembly according to the present invention.
Figure 1B:
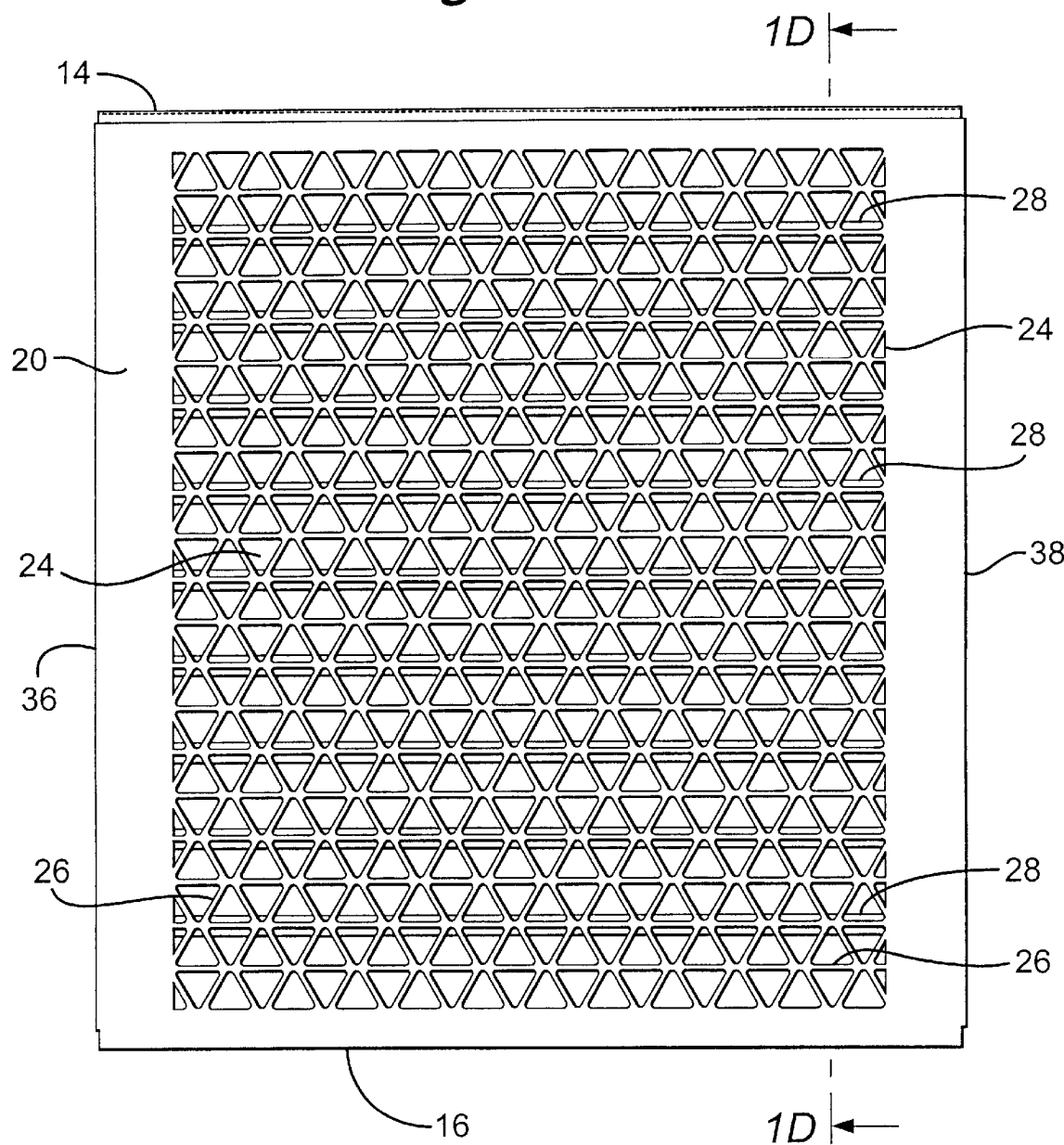
FIG. 1B is a top view of part of the screen assembly of FIG. 1A.

FIGS. 1A–1F show a screen assembly 10 according to the present invention with a unibody structure 20 according to the present invention. The screen assembly 10 has, optionally, three layers 11, 12, 13 of screening material bonded to a top surface 22 of the unibody structure 20. Preferably, the layers 11, 12, 13 are also bonded together over substantially their entire surface area.

A plurality of openings 24 through the unibody structure 20 define a plurality of support members 26. To the underside for the unibody structure 20 are, optionally, connected a plurality of spaced-apart ribs 28 which, in one aspect are welded to a metal unibody structure 20. In this particular embodiment the ribs 28 are positioned along a substantial majority of their length directly beneath one of the support members 26 that extend cross a major portion of the unibody structure 20; but it is within the scope of this invention to use no such ribs or to position them anywhere on the underside of the unibody structure 20. The unibody structure 20 has spaced-apart sides 36, 38.

As shown in FIG. 1C, the screen assembly 10 has an end 14 and a "ledge" end 16. The ledge end has an upper ledge portion 17 that rests on a shoulder 15 of an end 14 of an adjacent screen. Thus one screen end 16 seals against another screen end 14 when such screens are used end-to-end, as shown in FIG. 1G. In one particular embodiment four screens as in FIG. 1D are used on a shaker in two end-to-end pairs with the pairs side by side. Each pair is positioned in "C" channels. One of the screens is moved into the "C" channel supports ledge end 16 first. Then the ledge end 16 of the second screen is moved into the "C" channels so that it sealingly abuts the end 14 of the first screen. The other pair is similarly installed.

Figure 1E:
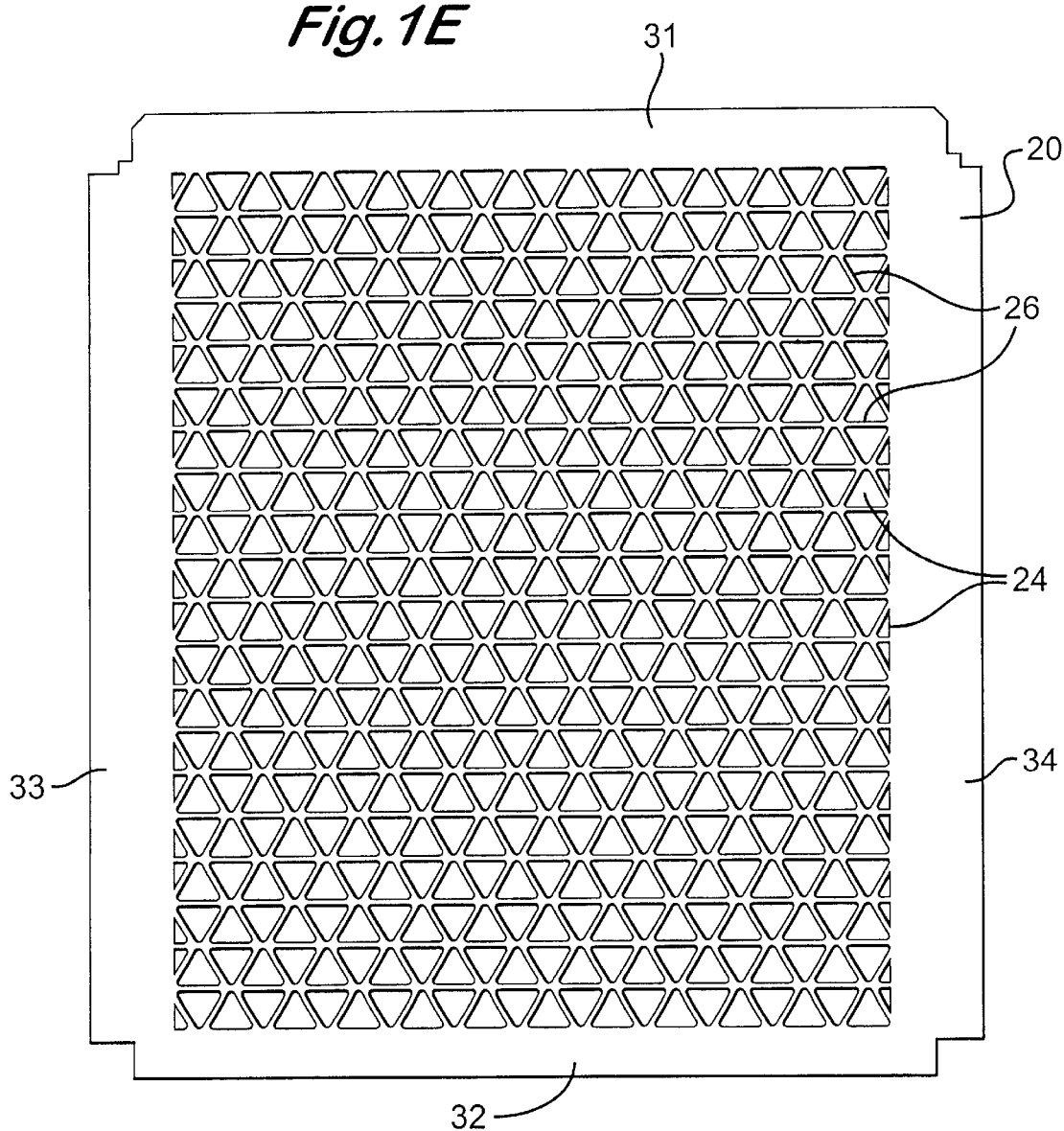
FIG. 1E is a flattened out view of the screen assembly part of FIG. 1B.

As shown in FIG. 1E, the unibody structure 20 is, initially, a single integral piece of material in which the pattern of openings 24 is formed, e.g. by any suitable cutting tool, punch, laser, or plasma beam or arc. Alternatively, the area shown in FIG. 1E with the openings 24 may be removed so that all that is formed according to the present invention is a four-sided structure to which is applied one, two, three or more layers of screening sheet(s) and/or screening material; including but not limited to a perforated sheet or plate and/or any desired number of layers of screening material, bonded or unbonded.

Figure 1F:
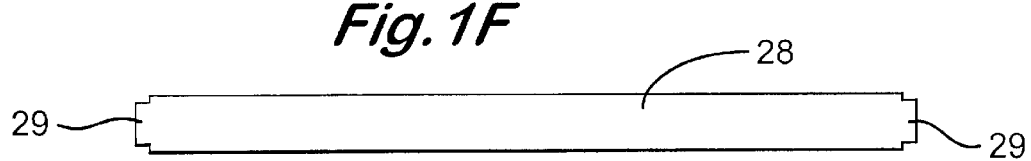
FIG. 1F is a flattened out view of part of the screen assembly of FIG. 1A.

Extensions 31, 32, 33, and 34 are folded to form, respectively, the end, 14, end 16 and sides 36, 38. It is within the scope of this invention to fold the various extensions of the unibody structure with any suitable press brake, pliers, or bending device with or without applying heat to the structure. FIG. 1F shows a rib 28 which has not yet been bent or folded into the form shown in FIG. 1D. Ends 29 may be introduced into corresponding holes or slots (not shown) in the sides 36, 38 to facilitate securement of the ribs.

It is within the scope of this invention for the screen assembly 10 to have none, one, two, three or more layers of screening material, i.e., screen, mesh, and/or cloth made, e.g., of stainless steel wire and/or plastic. Any such layer or combination of layers may be bonded together (glued, welded, and/or sintered) in any known manner and/or bonded to the unibody structure 20 in any known manner. Any such layer or layers of screening material may be substantially flat or may be undulating (with a series of alternating ridges and valleys) as is well known in the art.

Figure 2:
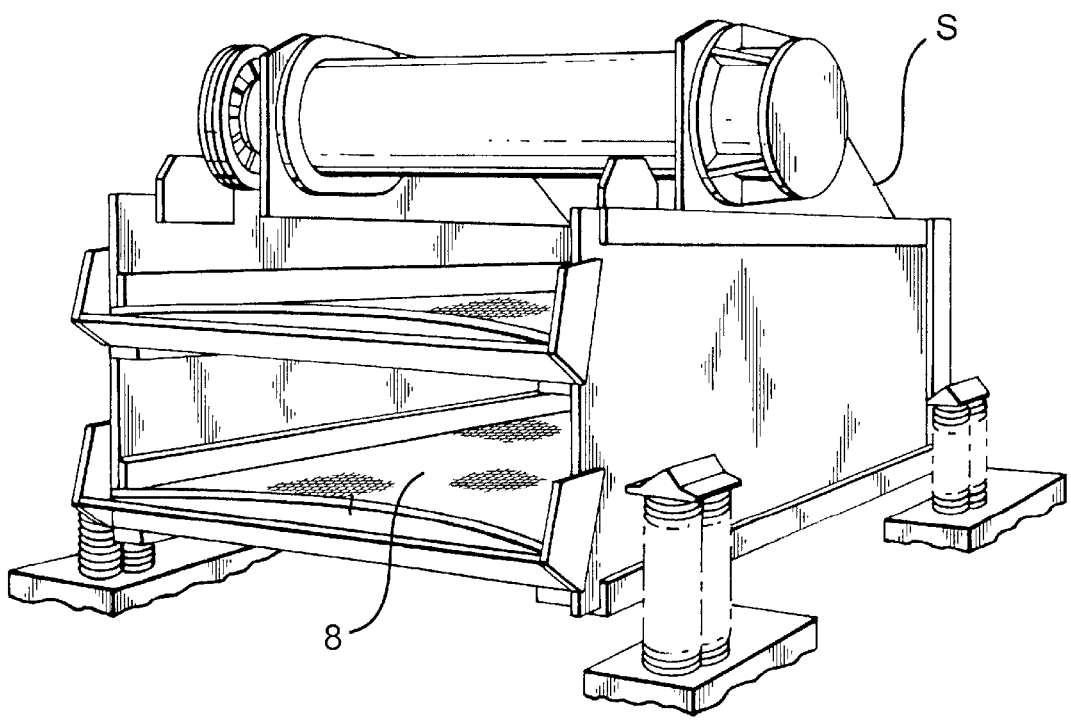
FIG. 2 is a perspective view of a shale shaker according to the present invention with a screen assembly according to the present invention.
Figure 4A:
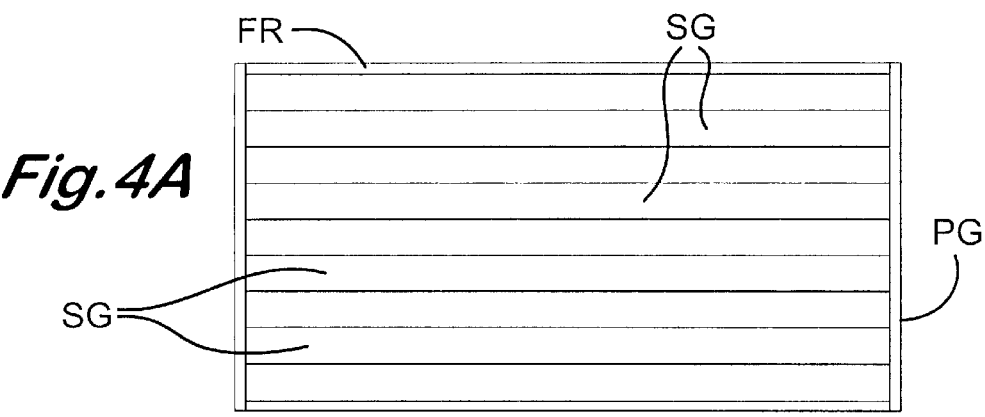
FIGS. 4A–4J are top views of patterns of openings that may be provided in a unibody frame according to the present invention.
Figure 4B:
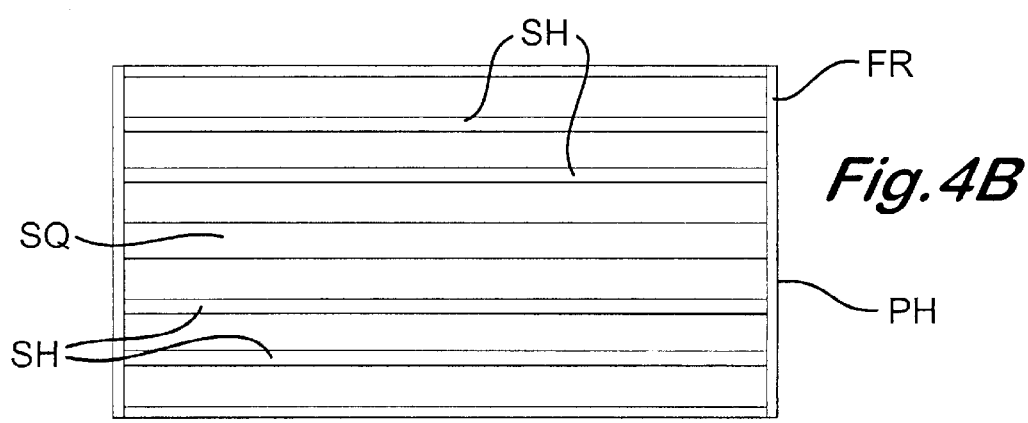

FIG. 2 shows a shale shaker S according to the present invention with a screen assembly 8 according to the present invention which may be any screen assembly disclosed herein according to the present invention. Any suitable known shaker or vibratory separator may employ one or more screens according to the present invention including but not limited to shakers as disclosed in U.S. Pat. Nos. 5,392,925 and 5,641,070 and in the references cited in each patent.

Edges on both sides of a unibody structure according to the present invention can form hook strips. In such an embodiment with hook strips a hook end (like the hook end 14), FIG. 1C) and/or a ledge end (like the ledge end 16, FIG. 1C) may be deleted.

FIGS. 3A–3G are top views of alternative embodiments for the unibody structure F, each with a series of different-shaped openings 41, 42, 43, 44, 45, 46, 47 therethrough, respectively. Instead of placing sheets or layers of screening material over the openings, it is within the scope of this invention to emplace a plug or module with screening material in some or all of the openings of any screen assembly disclosed herein according to the present invention. In certain aspects, the plugs or modules are as disclosed in U.S. Pat. Nos. 5,988,397 or 5,490,598, parents of this case.

Figure 3A:
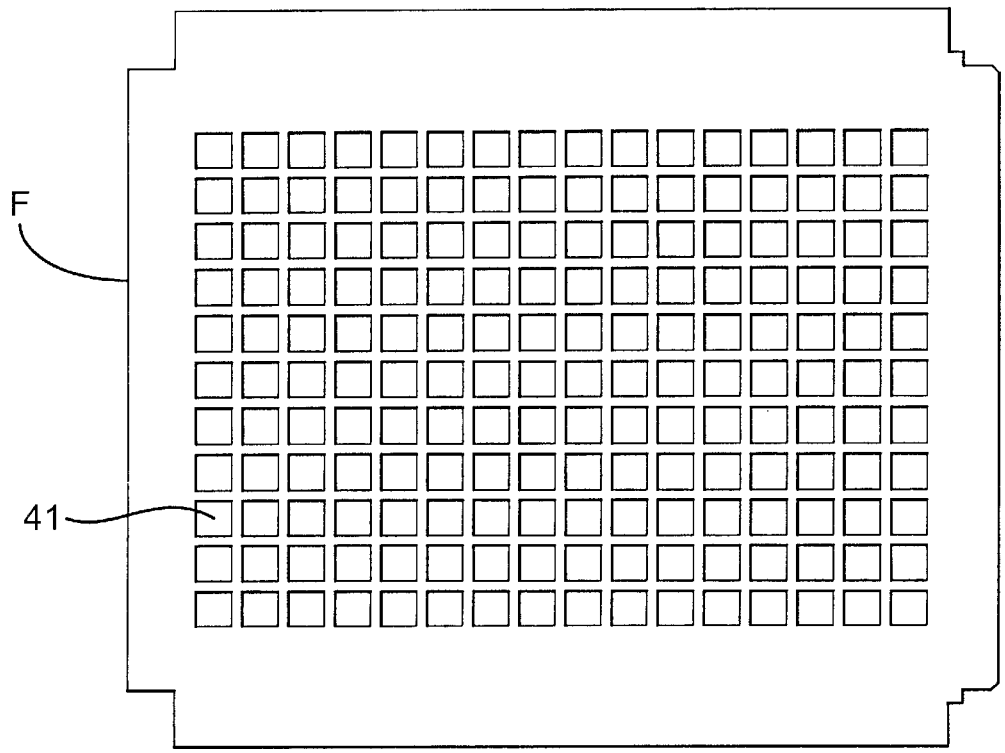
FIGS. 3A–3G are top views of alternative embodiments for a part like the part of FIG. 1B of a screen assembly according to the present invention.
Figure 3B:
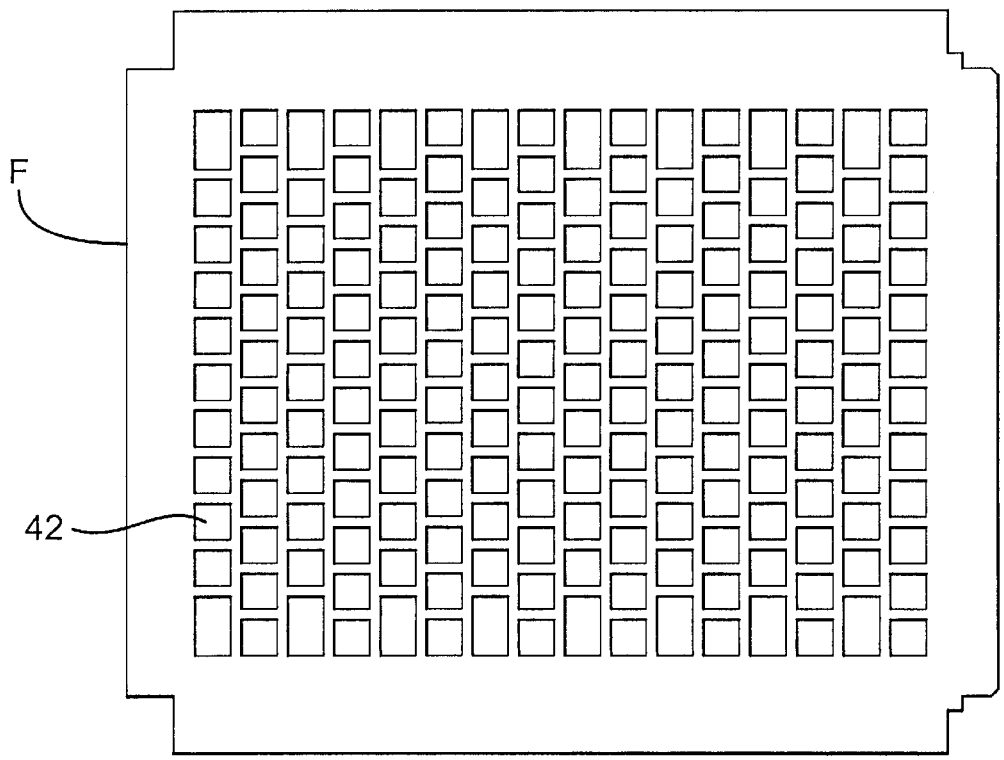
Figure 3C:
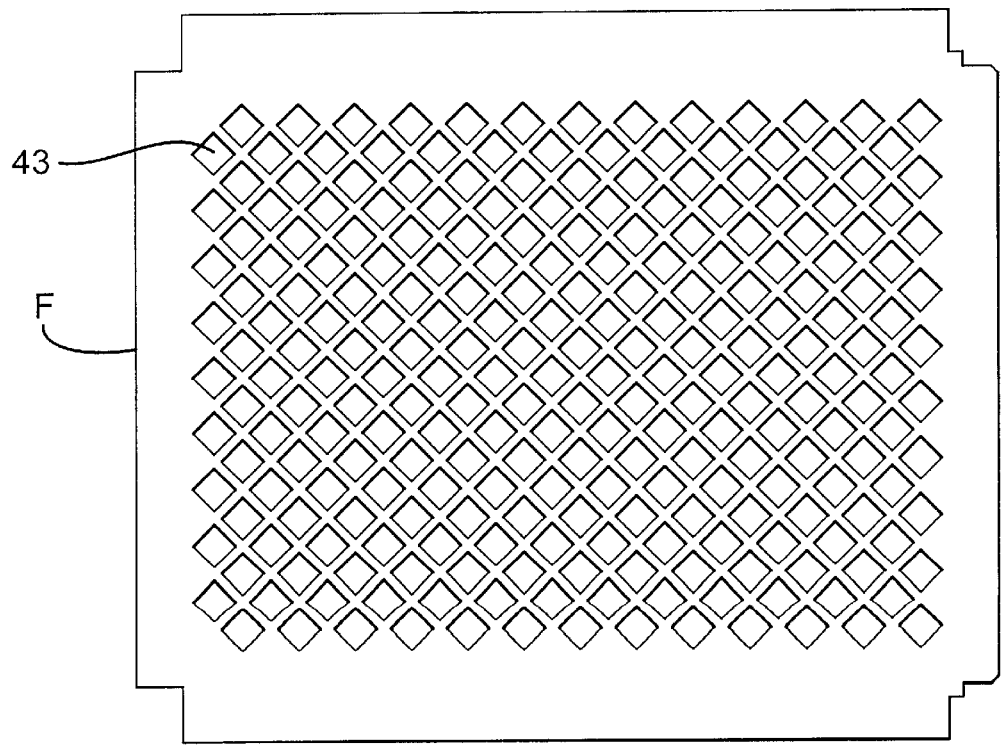
Figure 3D:
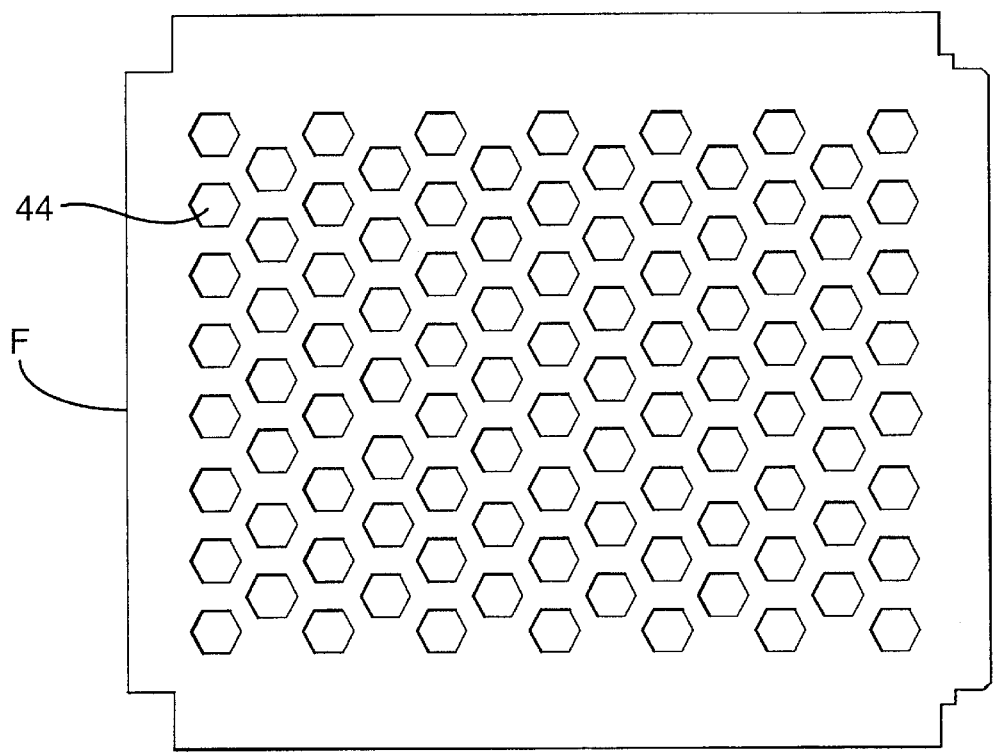
Figure 3E:
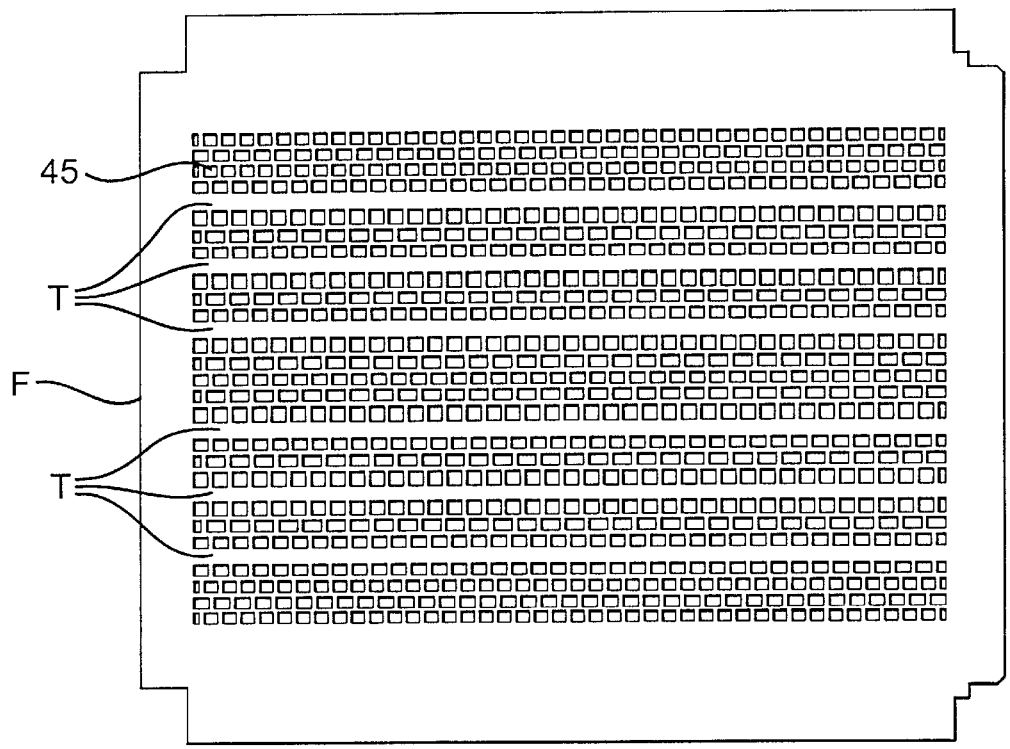
Figure 3F:
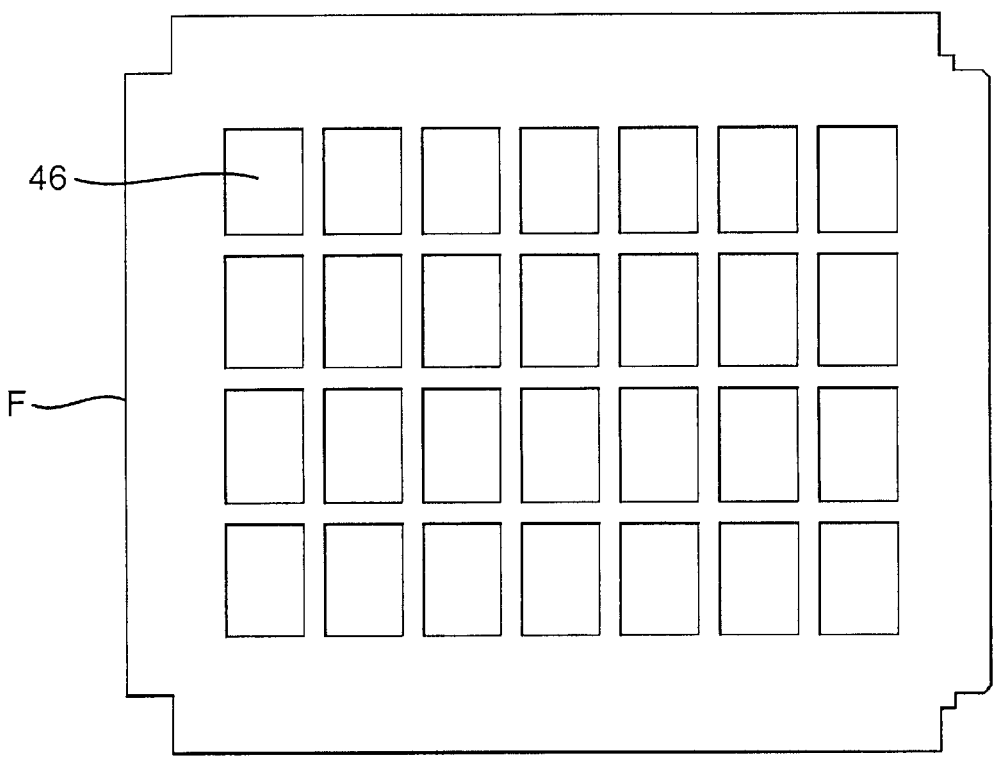
Figure 3G:
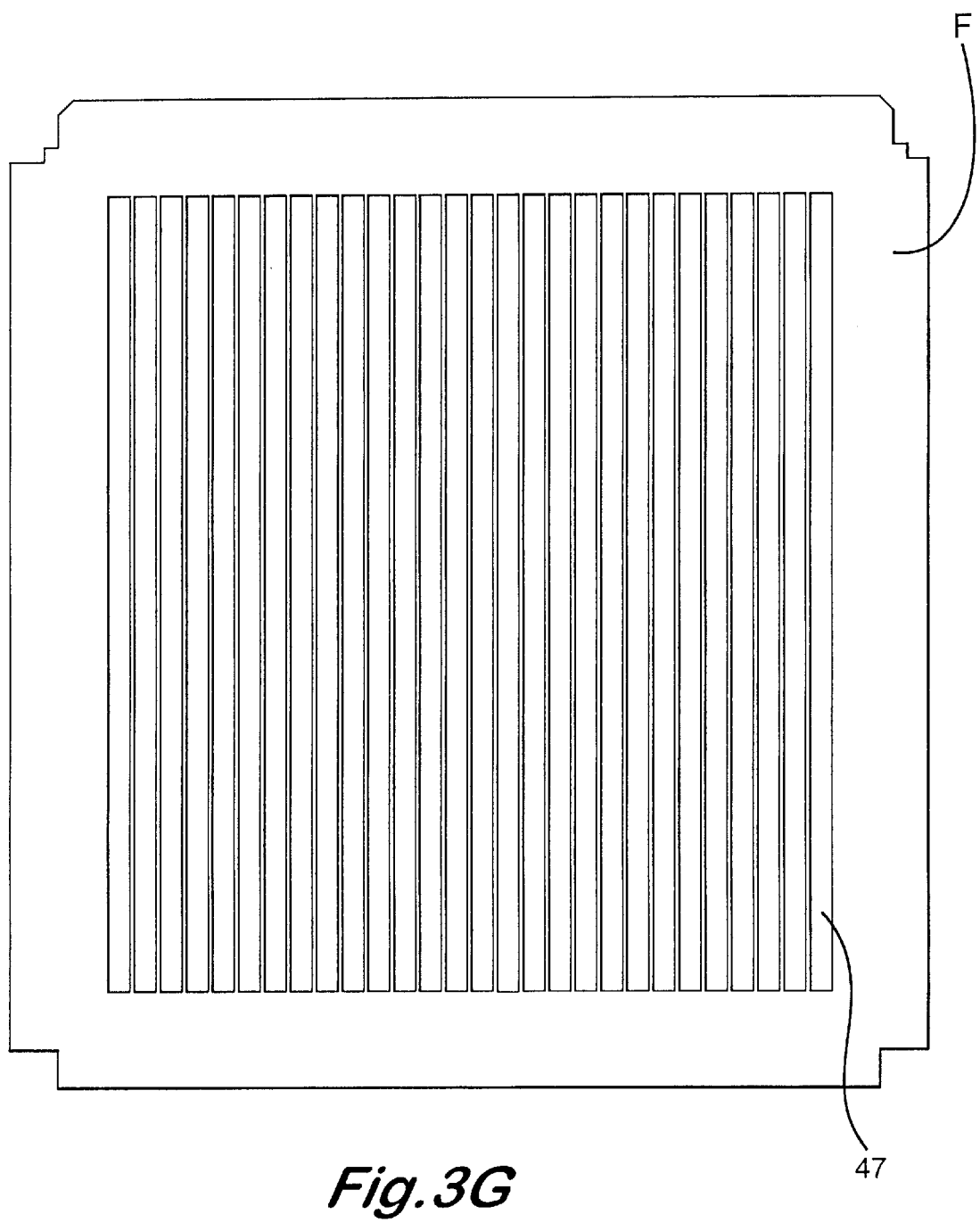
Figure 4C:
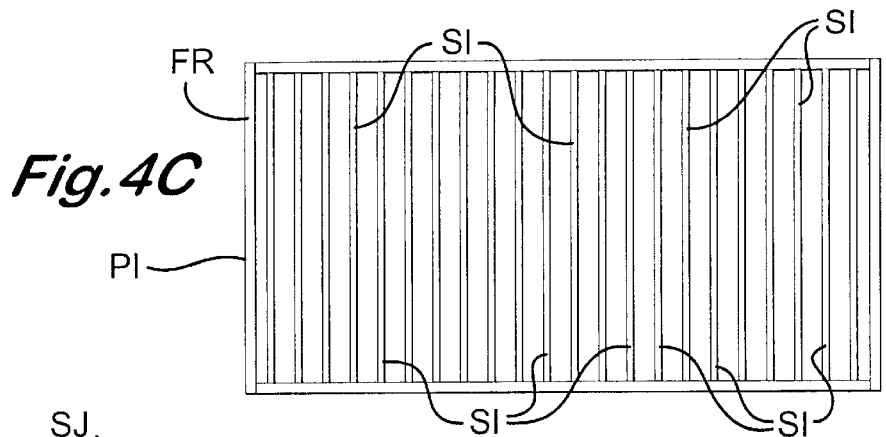
Figure 4D:
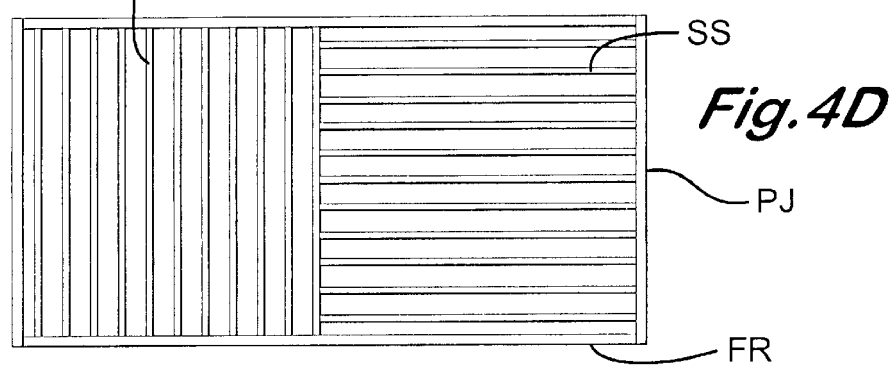
Figure 4E:
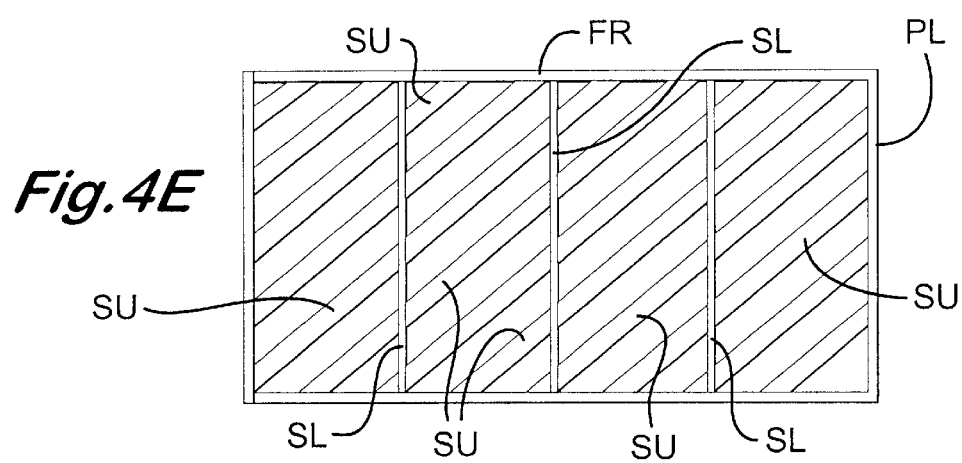
Figure 4F:
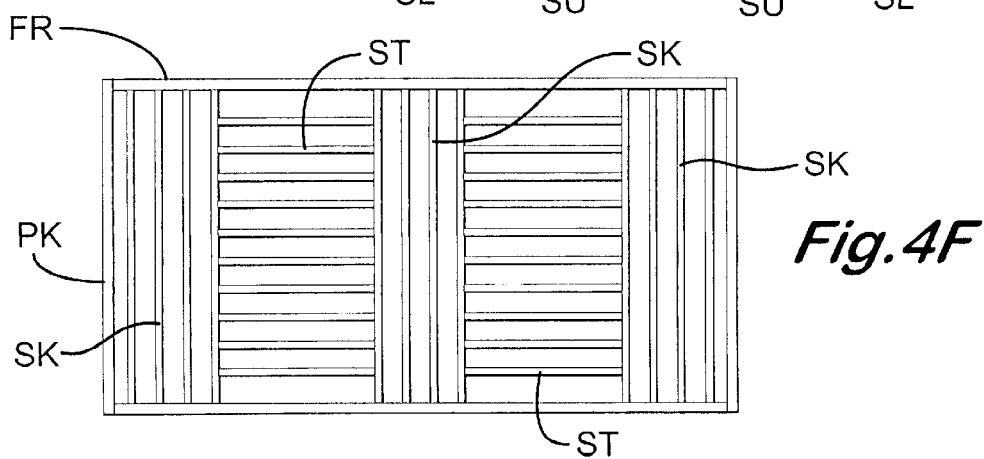
Figure 4G:
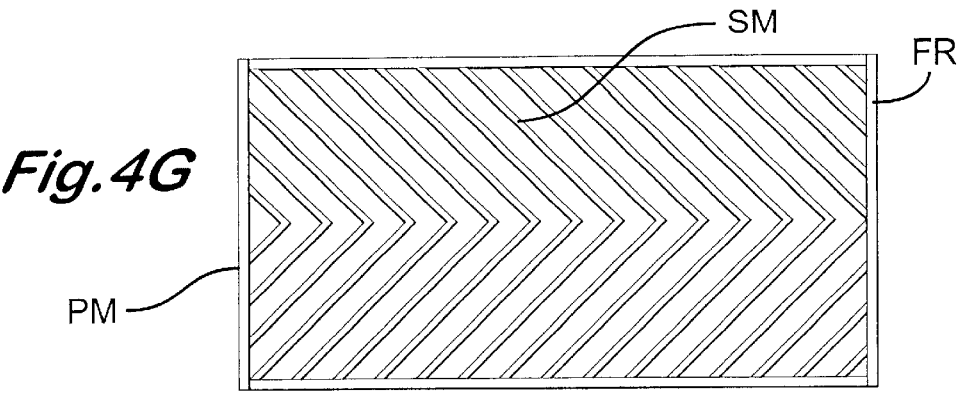
Figure 4H:
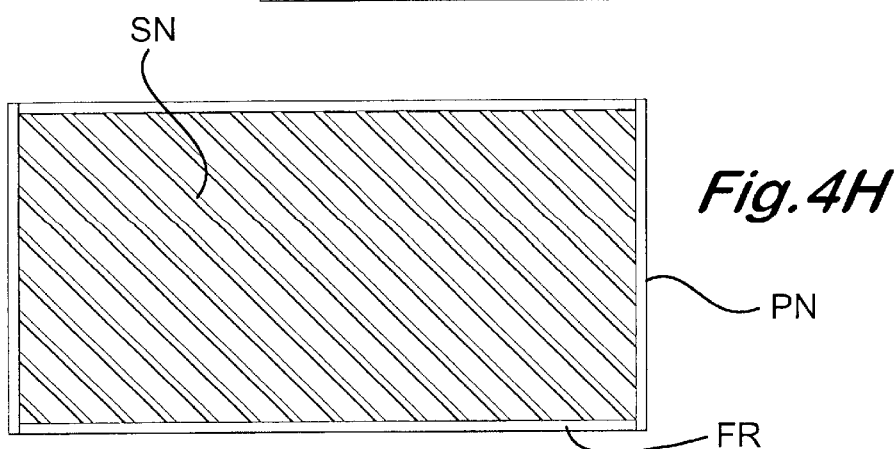
Figure 4I:
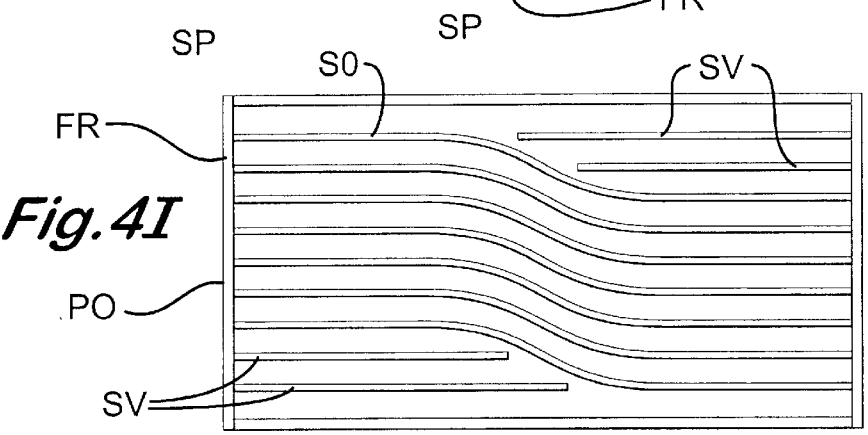
Figure 4J:
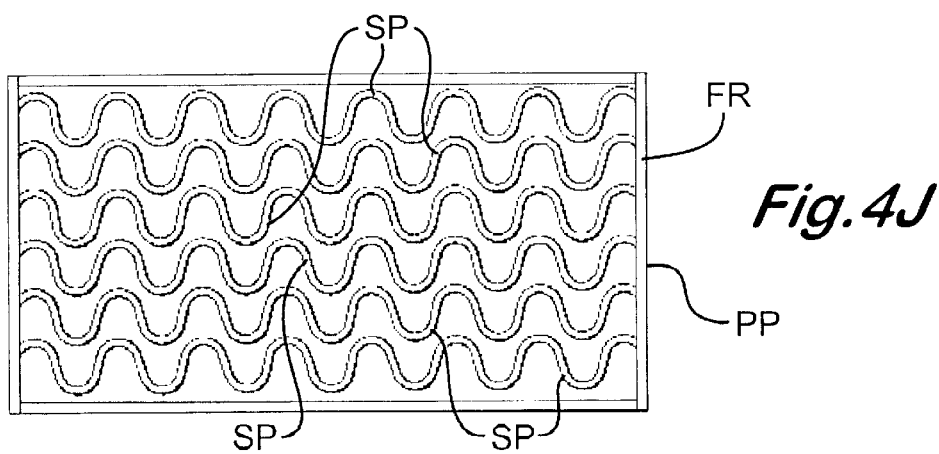

Also, e.g. as shown in the embodiment of FIG. 3E, it is within the scope of this invention to provide one or more areas or strips T without openings.

FIGS. 4A–4J replicate the panels disclosed in FIGS. 45G–45P of pending U.S. application Ser. No. 288,572, filed Jan. 11, 1999, a parent of this case, and are reproduced here to illustrate certain possible opening/support member patterns for a unibody structure according to the present invention. Of course if any such opening/support pattern is used in a unibody structure according to the present invention the ends and sides of the panels as disclosed in FIGS. 45G–45P of the cited application may be deleted.

In certain embodiments of a screen assembly with a unibody structure according to the present invention as described above has no separate pieces added to form parts, e.g. sides, hook strips, hook end, ledge end, etc. and is, therefore, relatively less expensive to make. By reducing or eliminating seams and connection areas, a relatively more substantial screen assembly is possible.

Figure 5A:
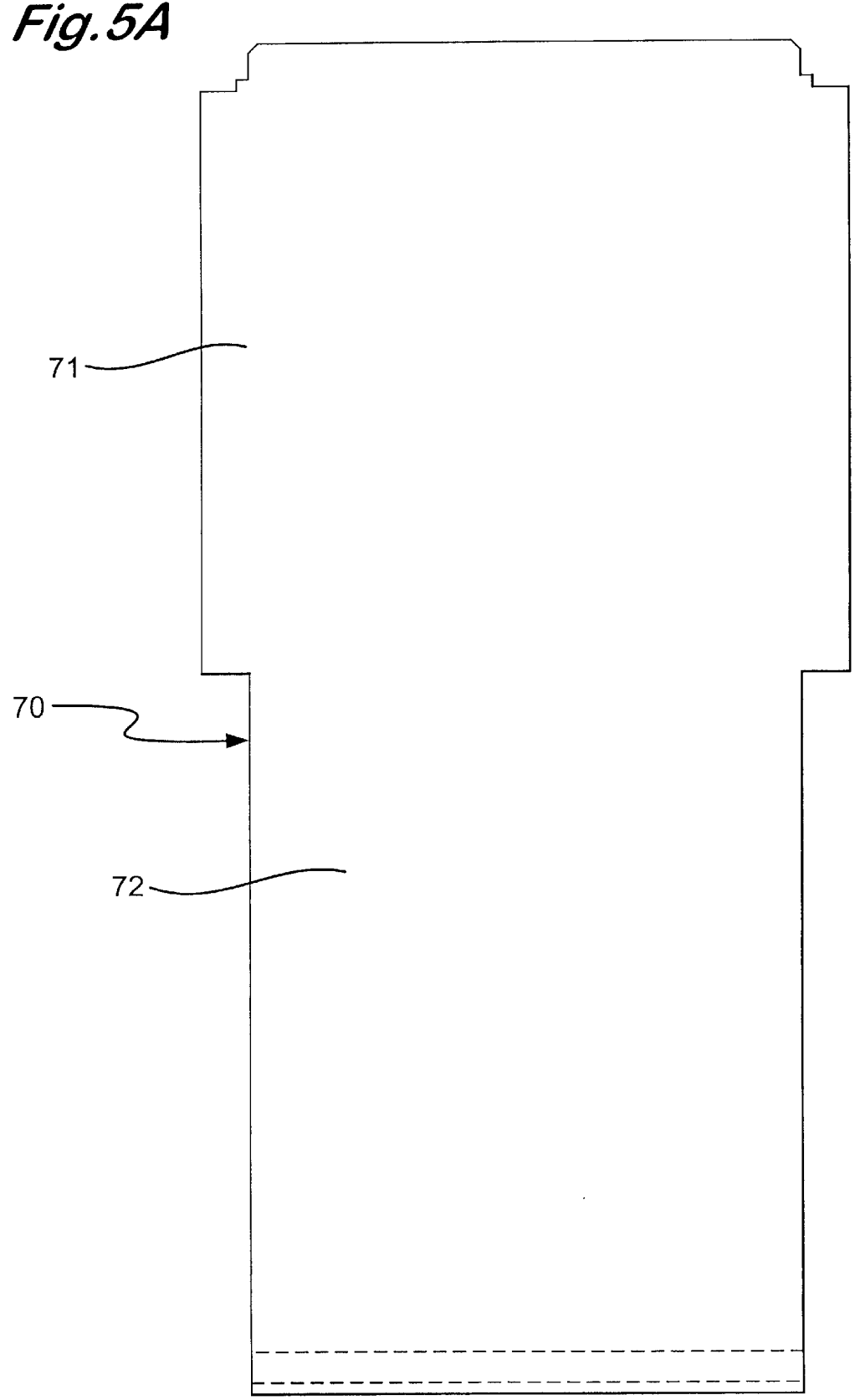
FIG. 5A is a top view of a single piece of material to be used to make a unibody structure according to the present invention.
Figure 5B:
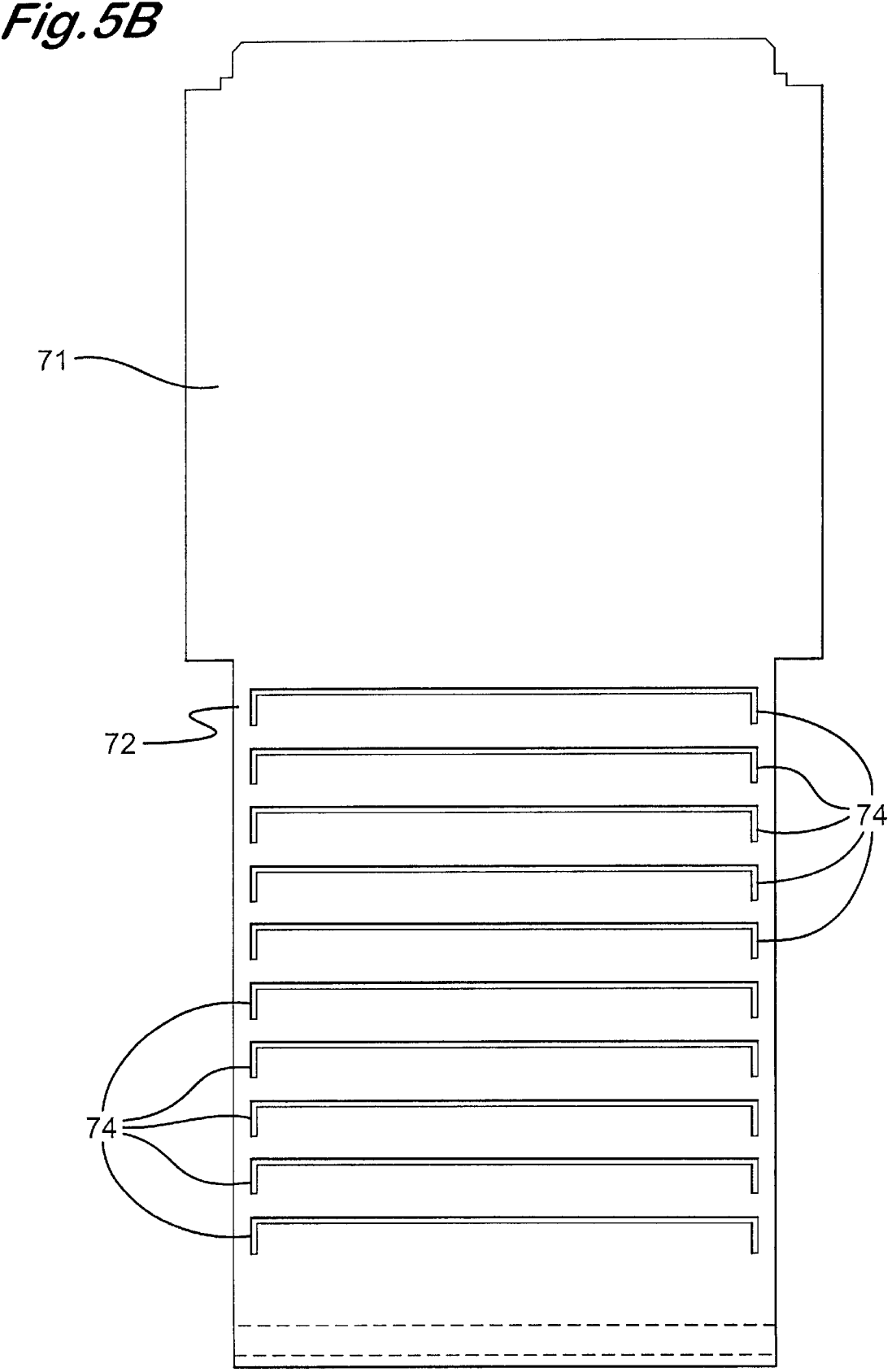
FIG. 5B shows the material of FIG. 5A with slots cut to form support ribs.

FIGS. 5A–5E illustrate a unibody structure 70 according to the present invention that is initially a single integral piece of material that is cut or machined to the shape shown in FIG. 5A that includes a first portion 71 in which will be made a pattern of openings and a second portion 72 in which will be made a series of rib supports. As shown in FIG. 5B a series of slots 74 are made (cut, drilled, punched, or machined in any suitable manner) in the second portion.

Figure 5C:
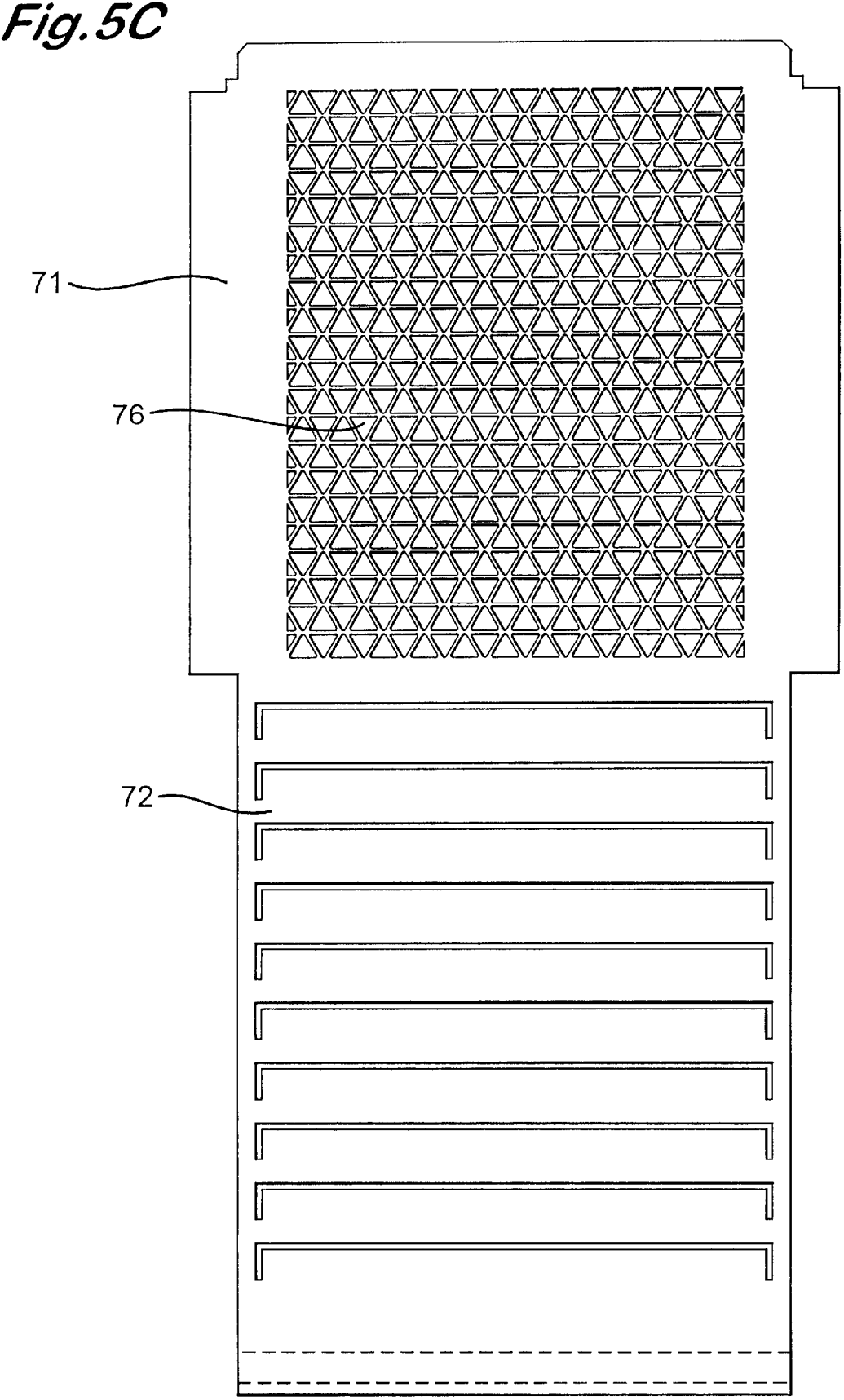
FIG. 5C shows the material of FIG. 5B with a pattern of openings.

As shown in FIG. 5C a pattern of openings 76 is made (cut, drilled, punched, or machined in any suitable manner) in the first portion 71. These openings and their pattern may be any suitable shape opening in any desired pattern, including, but not limited to, any opening shape and pattern disclosed herein. The openings 76 may be of such a size that no additional screening material is placed over them; or, alternatively, any screening material disclosed herein, bonded or unbonded, may be placed over the openings 76.

As shown in FIG. 5D rib supports 78 have been bent or folded away from the second portion 72. As shown in FIG. 5E the first portion 71 has been folded or bent with respect to the second portion 72. As shown in FIGS. 5F–5G the first portion 71 has been folded or bent over onto the second portion 72 so that an underside of the first portion 71 contacts top surfaces 79 of the rib supports 78. The first portion 71 may be glued, bolted, screwed, or welded to top surfaces 79 of the rib supports 78 [or Velcro™ material may be used to secure the portion 71 to the ribs 78]. FIGS. 5I–5K show the structure of FIG. 5F with screening material 80 thereon. The screening material 80 may be, in at least certain preferred embodiments, any known screen, screens, mesh, and/or meshes in any known combination, bonded or unbonded to each other, bonded or unbonded to the top portion 71, and/or of different weaves or similar weaves. As shown in FIGS. 5H and 5F the ends 73, 75 correspond, respectively, to ends 14 and 16 of the screen of FIG. 1A and function similarly to effect the sealing end-to-end abutment of such screens.

FIG. 6 shows a screen assembly 90 according to the present invention which has a unibody structure 92 which is substantially flat and with ends 93 folded or bent to form "hook strips" for securing the screen assembly 90 in various shakers and separators that employ such a screen connection apparatus. Such hook strips may be provided with any unibody structure disclosed herein. Such a unibody structure may be used instead of various prior art devices which employ, e.g. a plate to which channel-shaped members are welded or otherwise secured; for example, but without limitation, the unibody structure can be used in devices like those of U.S. Pat. Nos. 5,720,881 and 4,575,421 (and those of the references cited in these two patents) instead of the plate/channel-shaped member combinations disclosed in these patents. Screening material 94 (as any described herein with respect to layer(s), mesh(es), bonding etc.) has an undulating shape as viewed in FIG. 6. It is shown with lower parts touching and fixed to a top surface of the unibody structure 92, but it may be spaced-apart from this surface. It is within the scope of this invention to employ undulating screening material on any unibody structure and with any screen assembly disclosed herein. Optionally, the screening material 94 may be substantially flat. The unibody structure 92 may be, as viewed from above, like any unibody structure disclosed herein. In another aspect, the screening material 94 is a portion like the first portion 71 (FIG. 5A) and is folded over to a position as shown in FIG. 6, rather than affixed as a separate piece. Alternatively, what is shown as the screening material 94 in FIG. 6 may be a support structure for additional screening material placed thereon.

The present invention provides, therefore, in at least some (but not necessarily all) embodiments, a unibody structure for a screen assembly for a vibratory separator, the unibody structure including an integral body member with a portion having a plurality of spaced-apart openings therethrough defining a pattern of a plurality of spaced-apart screening openings, and the integral body member including side portions and/or end portions foldable to form a pair of spaced-apart integral side members and/or end members. Such a unibody structure may include one or some (in any possible combination) of the following: wherein one of the pair of spaced-apart end portions is configured with a shoulder support portion for sealingly abutting a screen ledge end of an adjacent screen; wherein one of the pair of spaced-apart end portions is configured with a ledge portion for sealingly abutting a shoulder portion of an end of an adjacent screen; wherein the side portions include subportions foldable to form a hook strip on each of two opposed sides of the unibody structure; wherein the integral body member has a plurality of spaced-apart support openings defining portions of the integral body member foldable to form a plurality of spaced-apart supports for the unibody structure; screening material over the plurality of spaced-apart screening openings; a plurality of spaced-apart support ribs connected to and beneath the portion of the integral body member with the plurality of spaced-apart screening openings; a vibratory separator (shaker, etc.) on which the unibody structure is mounted; screening material (bonded or not to the integral body member) over the plurality of spaced-apart screening openings; wherein the screening material comprises multiple layers of screening material (bonded or not to each other); wherein the plurality of spaced-apart screening openings further comprises a plurality of series of spaced-apart screening openings, each series spaced-apart from the other series by solid portions of the integral body member; and/or wherein the integral body member has spaced-apart connector portions foldable to form connection structure for securing the unibody structure to a vibratory separator apparatus.

The present invention provides, therefore, in at least some (but not necessarily all) embodiments, a unibody structure for a screen assembly for a vibratory separator, the unibody structure with an integral body member having four sides, including two pairs of spaced-apart sides, and a portion having a plurality of spaced-apart openings therethrough defining a pattern of a plurality of spaced-apart strips, and the integral body member including at least two side portions at one of the two pairs of spaced-apart sides foldable to form a pair of spaced-apart integral side members. Such a unibody structure may include one or some (in any possible combination) of the following: the integral body member including a second portion adjacent the first portion, the second portion foldable over the first portion, the second portion having a plurality of openings therethrough for fluid flow therethrough; wherein the strips of the plurality of spaced-apart strips are foldable to form support ribs for the second portion of the integral body member; vibratory separator apparatus, and the unibody structure installed on the vibratory separator apparatus and/or wherein the plurality of spaced-apart support strips are substantially parallel to each other.

The present invention provides, therefore, in at least some (but not necessarily all) embodiments, a unibody structure for a screen assembly for a vibratory separator, the unibody structure with an integral body member with a central cut-out portion, and the integral body member including side portions foldable to form two pairs of spaced-apart integral side members; such a unibody structure wherein the integral body member has spaced-apart connector portions foldable to form connection structure for securing the unibody structure to a vibratory separator apparatus; and/or such a unibody structure wherein the connection structure comprises a hook strip on each of two spaced-apart sides of the unibody structure.

Figure 7A:
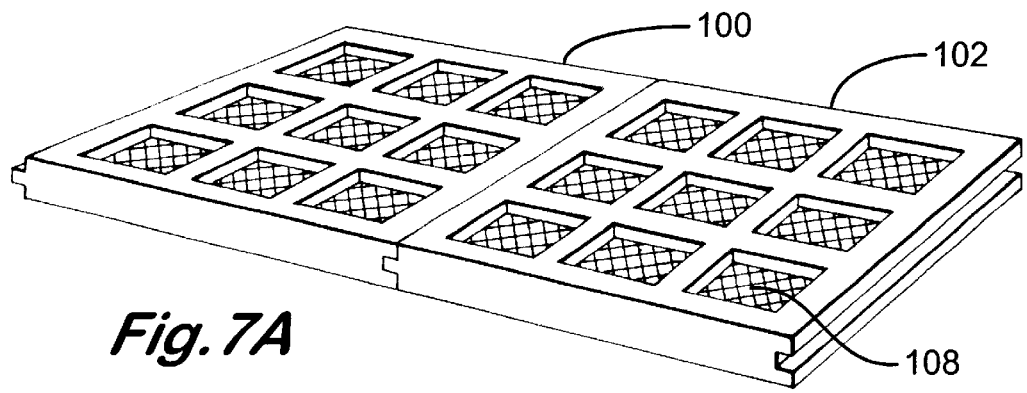
FIG. 7A is a perspective view of a screen assembly according to the present invention.
Figure 7B:
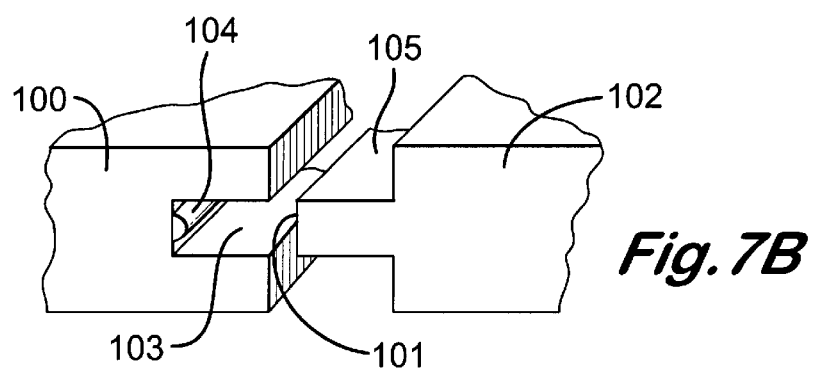
FIG. 7B is an enlarged view of part of the screen assembly of FIG. 7A.
Figure 7C:
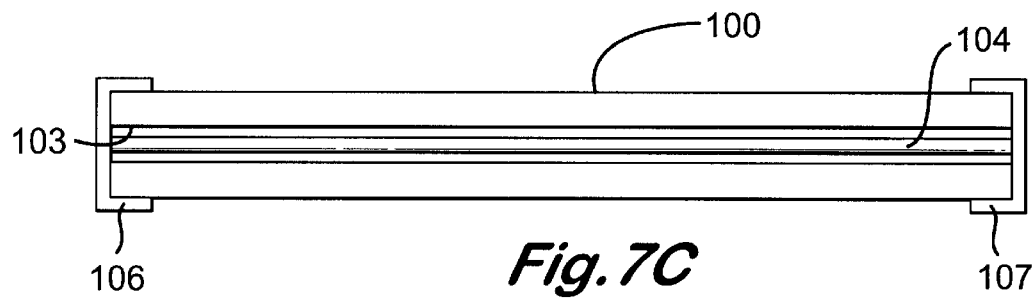
FIG. 7C is a cross-section view of a screen of FIG. 7A.

FIGS. 7A–7C show a screen assembly according to the present invention. That includes screens 100 and 102. A similar assembly is disclosed in UK Patent GB 2,206,501 B (incorporated fully herein for all purposes) but without the improvements according to the present invention.

As shown in FIGS. 7B and 7C, the screen 100 has an end with a groove 103 that extends from one side of the screen 100 to the other. A seal member 104 also extends within the groove from one side of the screen 100 to the other side. The seal member 104 may be formed integrally of the screen 100 or it maybe a separate member adhered and/or secured to the screen 100 with any suitable known adhesive, glue, and/or fastener.

The groove 103 is sized and configured to receive a tongue 105 of the screen 102. An end surface 101 of the tongue 105 sealingly abuts the seal member 104 of the screen 100. Such a tongue-and-groove combination may be provided for any screen or screen assembly disclosed herein or in any patent or application mentioned herein.

The screens 100 and 102 have screening areas 108 that include screening material and are defined by openings in the screens 100 and 102.

Figure 8A:
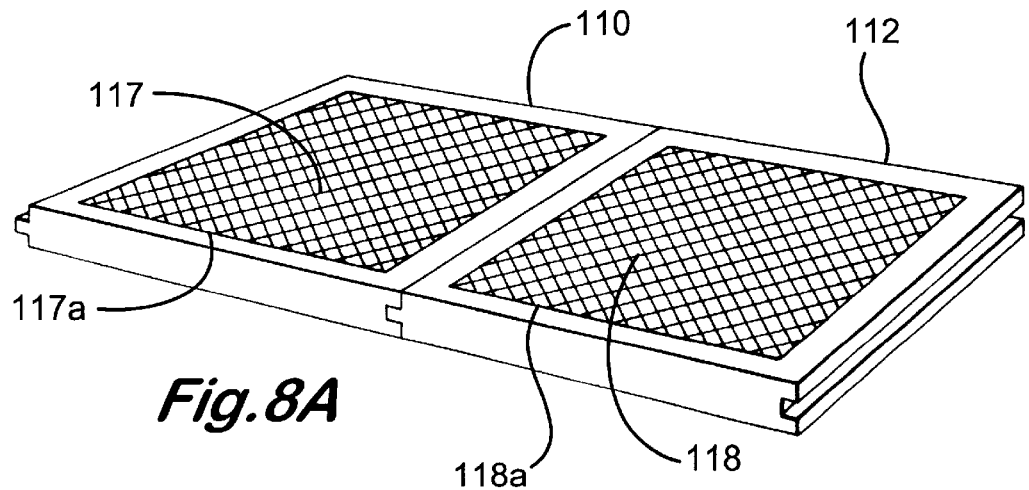
FIG. 8A is a perspective view of a screen assembly according to the present invention.

Screens 110 and 112 as shown in FIGS. 8A and 8B are similar to the screens of FIG. 7A; but screening material 117, 118 (which may be any screening material or combination thereof disclosed herein) covers openings 117a, 118a, respectively, through the screens 110, 112, respectively. Optionally, any known screen support, strips, straps, or plate may be used with the screens 110, 112 beneath the screening material.

A seal member 114 is like the seal member 104, FIG. 7B; a tongue 115 and end surface 111 are like the tongue 105 and end surface 101, FIG. 7B, respectively; and a groove 113 is like the groove 103, FIG. 7B.

FIGS. 9A and 9B show a screen assembly according to the present invention with screens 120 and 122 which are similar to the screen of FIGS. 7A and 8A; but a tongue 125 of the screen 122 has an end surface 121 with a groove therein that is sized, positioned, and shaped to receive therein at least a portion of a seal member 124 in a groove 123 of the screen 120. The groove 126 extends across the tongue 125, from one side of the screen 122 to the other. Correspondingly, the seal member 124 extends across the screen 120.

FIGS. 10A and 10B show a screen assembly according to the present invention with screens 130 and 132 which are like the screens 110, 112 of FIG. 8A; but the screen 132 has a tongue 135 (like the tongue 115, FIG. 8B) with an end surface 131 (like the end surface 11, FIG. 8B) with a groove 136 that extends across the screen 132 from one side to the other and sealingly receives therein at least a portion of a seal member 134 in a groove 133 (like the groove 113, FIG. 8B) of the screen 130. Screening material 138 is like the screening material 118, FIG. 8A, over openings, not shown, like the openings 117a, 118a of FIG. 8A. The screen 130, optionally, has a seal member 139a along each of its sides 130a, 130b; and the screen 132 has a seal member 139b along each of its sides 132a, 132b. The seal members 139a, 139b may be any seal member disclosed herein adhered or secured in any manner disclosed herein. Any screen or screen assembly disclosed herein may have side seal members like the seal members 139a, 139b in addition to, or instead of, any of the end seal members disclosed herein.

FIGS. 11A–11H illustrate partially various screens according to the present invention with a variety of seal members. For each of these screens, although they are shown partially, it is to be understood that they are like the complete screens or screen assemblies disclosed herein and/or referred to herein and that the structures of FIGS. 11A–11H may be used for any screen or screen assembly referred to or disclosed herein.

FIG. 11A shows a screen A1 with a groove A3 (like the groove 103, FIG. 7B) and a seal member 140 (like the seal member 104, FIG. 7B. The screen A2 is like the screen 102, FIGS. 7A, 7B.

FIG. 11C shows a screen C1 with a groove C3 (like the groove 103, FIG. 7B) and seal members 142 and 143 (like the seal member 104, FIG. 7B). The screen C2 is like the screen 102, FIGS. 7A, 7B.

FIG. 11D shows a screen D1 with a groove D3 (like the groove 103, FIG. 7B) and an amount 144 of a releasably cooperating fastener material (e.g. hook-loop material or VELCRO—TM material). The screen D2 is like the screen 102, FIGS. 7A, 7B. The screen D2 has an amount 145 of a releasably cooperating fastener material (e.g. hook-loop material or VELCRO—TM material) on an end of a tongue D5.

FIG. 11E shows a screen E1 with a groove E3 (like the groove 103, FIG. 7B) and a seal member 146. The seal member 146 is held on a portion E4 of the screen E1 by a friction fit and/or by a suitable adhesive. The seal member 146 has an upper arm 147 and a lower arm 148 with a projecting rib 50 that releasably resides in a corresponding notch 149 of the portion E4. The projecting rib 50 extends along the entire length of the portion E4, but it is within the scope of this invention to use a single projecting bead or series of beads on the seal member 146 and corresponding recesses on the portion E4. The screen E2 is like the screen 102, FIGS. 7A, 7B.

FIG. 11F shows a screen F1 with a groove F3 (like the groove 103, FIG. 7B) and a seal member 151. The seal member 151 has a portion 151a that releasably resides in a corresponding recess 152 of the screen F1. Alternatively or in addition to having the seal member releasably connected to the screen F3, adhesive may be used to attach the seal member 151 to the screen F3 (as may the seal member 146 be attached to the screen E3, FIG. 11E and any seal member in any screen disclosed herein). The screen F2 is like the screen 102, FIGS. 7A, 7B.

FIG. 11G shows a screen G1 with a groove G3 (like the groove 103, FIG. 7B). A seal member 153 is on a tongue G4 of a screen G2 (like the screen 102, FIGS. 7A, 7B).

FIG. 11H shows a screen H1 with a groove H3 (like the groove 103, FIG. 7B). A screen H2 (like the screen 102, FIGS. 7A, 7B) has a tongue H4 with a seal member 155b.

Any seal member for any screen disclosed herein may be connected to, attached to or formed integrally of its corresponding screen. Any seal member shown in FIGS. 11A–12D is to be understood as, preferably, extending along the entire length of the side or tongue at which it is located; although shorter seal members used only on part of said sides or members are within the scope of this invention. FIGS. 12A–12D show partially various screens. For each of these screens, although they are shown partially, it is to be understood that they are like the complete screens or screen assemblies disclosed herein and/or referred to herein and that the structures of FIGS. 11A–11H may be used for any screen or screen assembly referred to or disclosed herein.

As shown in FIG. 12A, a screen 160 has a shoulder 160a and a lower surface 161 which is sealingly abutted by an end portion 163a of a tongue 163 of a screen 162 when the two screens are abutted end-to-end, e.g. in a shaker basket and/or a top of the end portion 163a sealingly abuts the shoulder 160a.

FIG. 12B shows screens 164 and 167 according to the present invention which are similar to the screens of FIG. 12A; but a shoulder 165 of the screen 164 has a tapered or inclined lower surface 165a that extends across the screen 164 to facilitate sealing emplacement of the screen 167, e.g. in a shaker basket, in abutting relationship to the screen 164 and/or a top surface of a tongue 166 of the screen 167 sealingly abuts the shoulder 165.

FIG. 12C shows screens 168 and 171 according to the present invention. The screen 168 has an end shoulder 169 with an end surface 170 and the screen 171 has a ledge 172 with a ledge end surface 172a that sealingly abuts the surface 170 when the screens 168 and 171 are abutted against each other end-to-end and/or a top of the ledge 172 sealingly abuts the end shoulder 169.

FIG. 12D partially shows screens 173 and 176 according to the present invention. The screen 173 has a shoulder 174 and an end surface 175. The screen 176 has a tongue 179 with an inclined top surface 177 extending thereacross and an inclined lower surface 178 extending thereacross. A front surface 179a of the tongue 179 is configured and positioned to sealingly contact the end surface 175 of the screen 173 when the two screens abut each other end-to-end and/or the surface 177 sealingly abuts the shoulder 174. Any seal member disclosed herein may be used with any screen in FIGS. 12A–12D, as may be any connection material disclosed herein.

FIGS. 13A–13C illustrate a screen assembly 180 according to the present invention which has a perforated plate 181 with a plurality of openings 181a therethrough. Optionally any perforated plate disclosed herein or in a patent or application referred to herein may be used instead of the plate 181 with any pattern for openings as viewed from about (as in FIG. 13A) and with any suitable glue pattern thereon. As shown in FIG. 13B, screening material 179 represent any screening material or combination thereof disclosed or referred to herein or in any patent or application referred to herein. The plate 181 is positioned between lips 183 of a frame 182. An end 184 has an inclined lower surface 184a that facilitates emplacement of another screen in end-to-end abutting relationship with the screen 180. An end of such another screen may sealingly abut an end surface 194 of the frame 182.

Figure 14K:
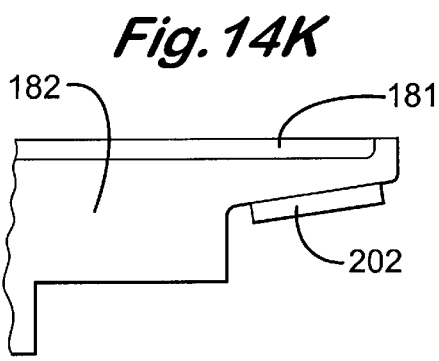
FIGS. 14A–14N are side cross-section views of an end of a screen assembly according to the present invention.
Figure 14L:
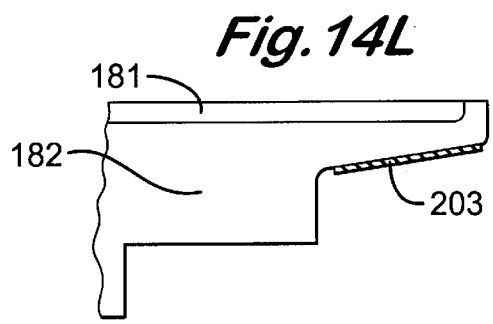
Figure 14M:
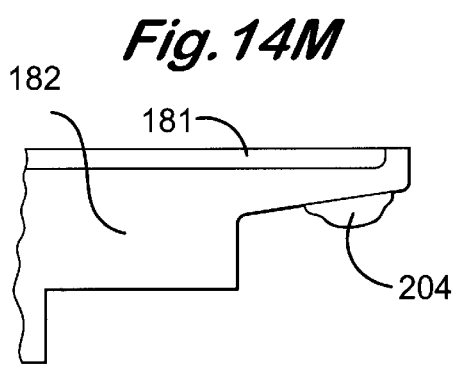
Figure 14N:
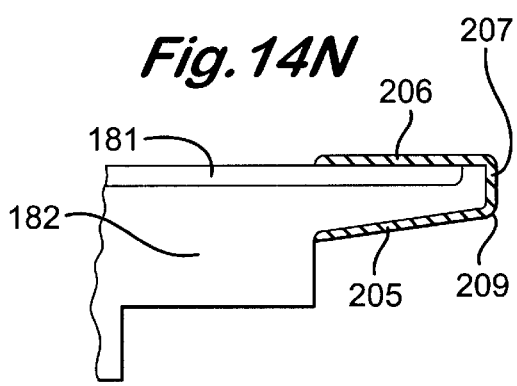

FIGS. 14A–14N illustrate various possible end structures for a screen such as the screen 180 of FIG. 13A. Also, such end structures may be used with any screen or screen assembly disclosed or referred to herein or in any patent or application referred to herein.

FIG. 14A shows a foam seal member 185 attached to the end surface 194 of the frame 182. FIG. 14B shows a seal member 186 which is urethane molded onto the screen 180.

FIG. 14C shows a seal member 190 that releasably clips onto the end 184 of the screen 180. The seal member 190 has a top part 190a, a bottom part 187, and a top bead 189 that releasably is held in corresponding recess 188 of the screen frame 182. The seal member 190 may be made of any suitable material, including, but not limited to, plastic, foam, and rubber.

FIG. 14D shows a seal member 191 which is rubber painted onto the end of the frame 182. FIG. 14E shows a seal member 192, e.g. made of rubber, foam, or plastic, which is secured to the frame 182 with one or more screws 193 or other suitable fasteners. Any seal member disclosed herein may, optionally (or in addition to adhesives or fasteners) be connected with releasable fastening material such as well-known hook-and loop fastener materials.

FIG. 14F shows a seal member 195 which is a mass or bead of caulking applied on the end of the frame 182. FIG. 14G illustrates a seal member 196 with a portion 198 sized and configured for receipt within a corresponding notch 197 in the frame 182. FIG. 14H shows a seal member 199 which is urethane molded onto the end of the frame 182. FIG. 14I shows a seal member 200 which is rubber sprayed onto the end of the frame 182.

FIG. 14J shows a seal member 201 which is urethane molded onto the end of the frame 182. FIG. 14K shows a seal member 202 which is foam secured on the end of the frame 182. FIG. 14L shows a seal member 203 which is rubber painted onto the end of the frame 182. FIG. 14M shows a seal member 204 which is a mass or bead of caulking applied on the end of the frame 182. FIG. 14N shows a seal member 209 which is a rubber coating applied by dipping the end 182 into a liquid mass of rubber. The seal member 209 has a top portion 206, a mid portion 207 and a bottom portion 205.

Figure 15A:
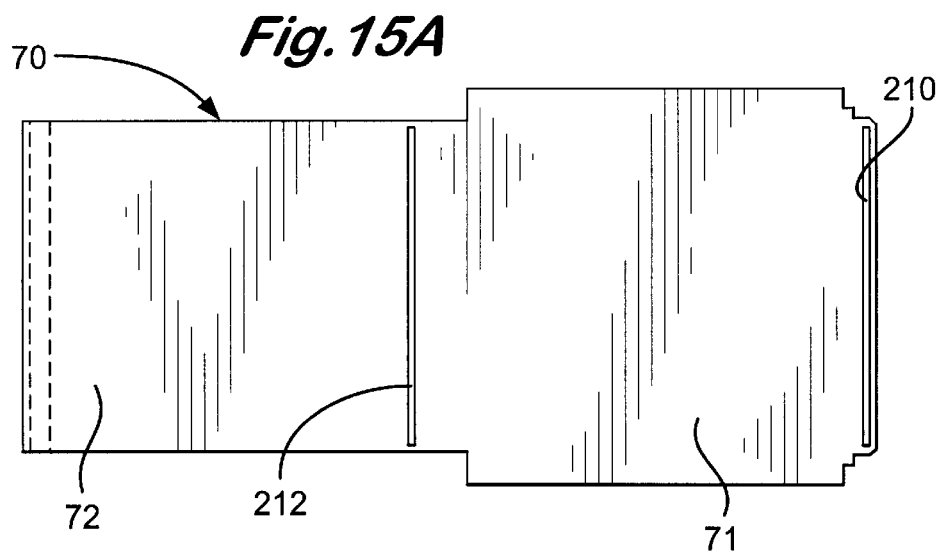
FIG. 15A is a top view of a unibody piece for a screen assembly according to the present invention.
Figure 15B:
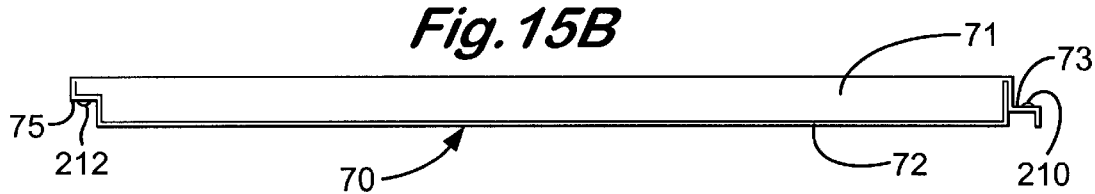
FIG. 15B is a side cross-section view of a screen assembly made with the piece of FIG. 15A.

FIGS. 15A and 15B show a unibody structure 70 as described above with a seal member 210 and a seal member 212, either one of which may be deleted. The seal members 210, 212 may be applied to the unibody structure at any time in the process of making a screen assembly with the unibody structure. Any seal member disclosed herein may be used as the seal member 210 or the seal member 212. Alternatively, a portion of the unibody structure itself may be sent or formed to form the seal members.

Figure 16A:
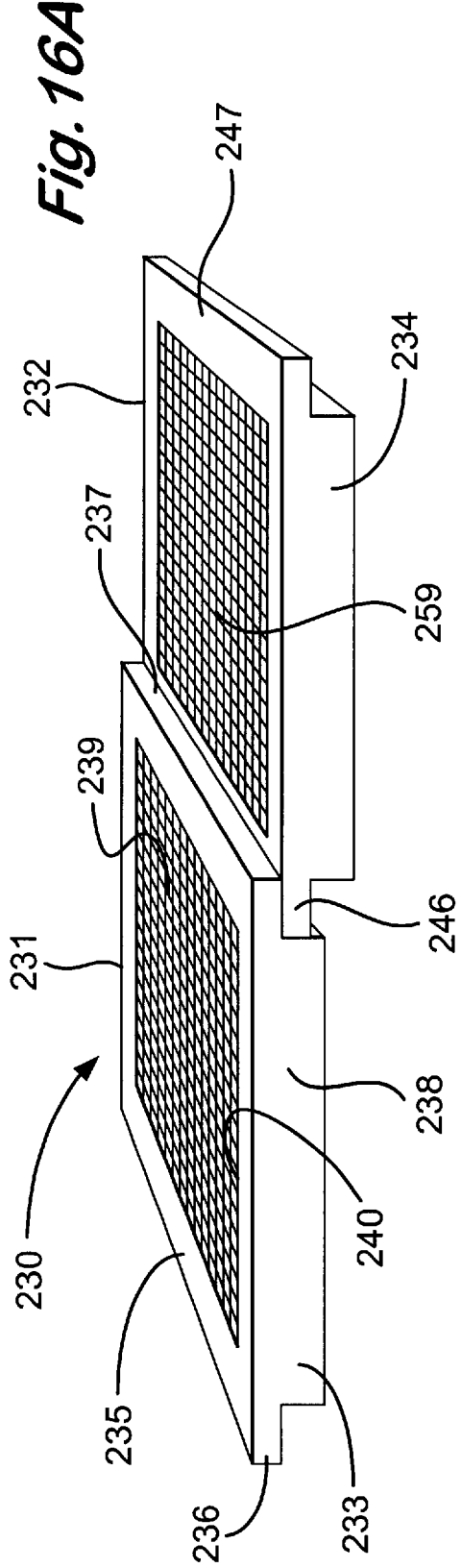
FIG. 16A is a perspective view of a screen combination according to the present invention.
Figure 16B:
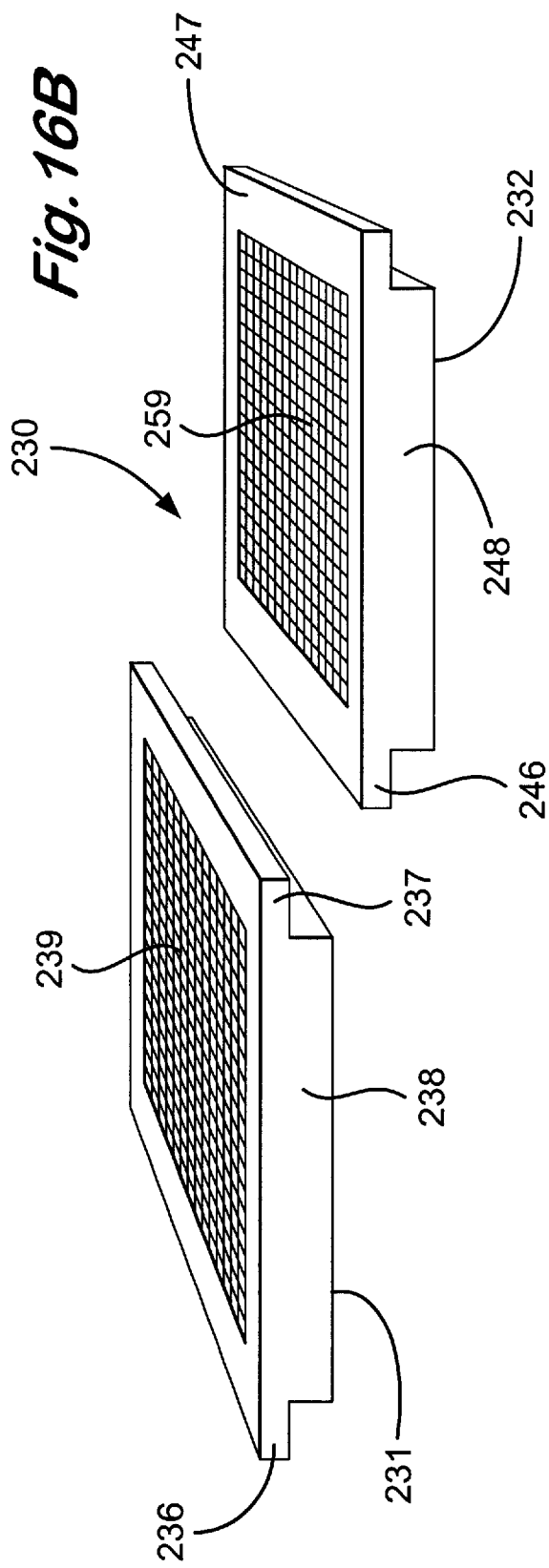
FIG. 16B is an exploded view of the screen combination of FIG. 16A.

FIGS. 16A and 16B illustrate a screen combination 230 according to the present invention which includes a first screen 231 and a second screen 232 according to the present invention. The screens 231, 232 each have, respectively, a frame 233, 234 which are substantially identical. The frame 233 has a top 235 and shoulders 236, 237 that project from a base 238. Screening material 239 (any disclosed herein) is over an opening 240 through the frame 233. Alternatively the frame itself may have a pattern or series of openings therethrough (any desired or referred to herein) over which screening material is placed. Any two similar screens according to the present invention may be used instead of the screens 231, 232.

As shown in FIG. 16A a shoulder 246 of the screen 232 (like the shoulder 236) is positioned beneath the shoulder 237 of the screen 231. The screen 232 has screening material 259 thereon. Preferably the shoulder 246 sealingly contacts the shoulder 237 along its length. The screen 232 also has a shoulder 247 and a base 248. The positioning illustrated in FIG. 16A is the positioning the screens have in the basket of certain vibratory separators. Any shape disclosed herein may be used for the shoulders and any seal or seal member or members disclosed herein may be used thereon.

Figure 16C:
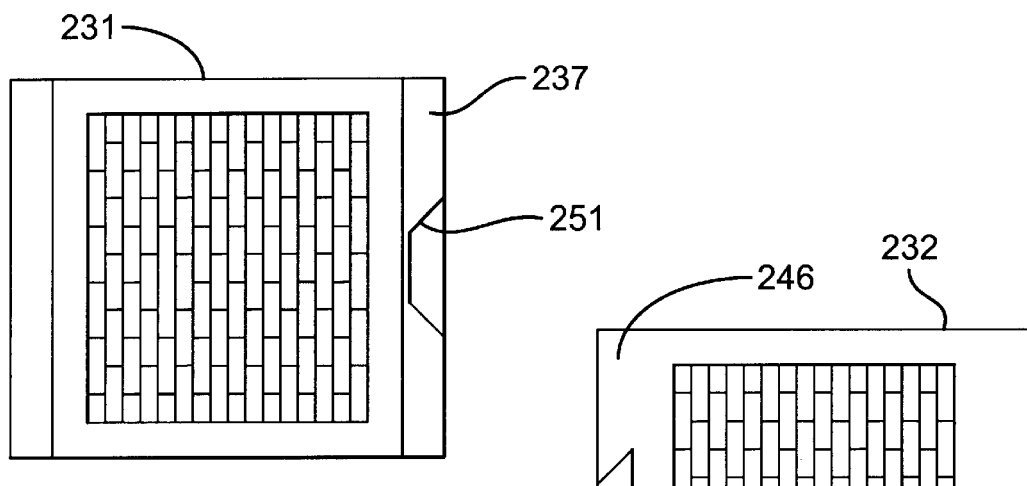
FIGS. 16C is a bottom view of a screen for use in a screen combination as in FIG. 16A.
Figure 16D:
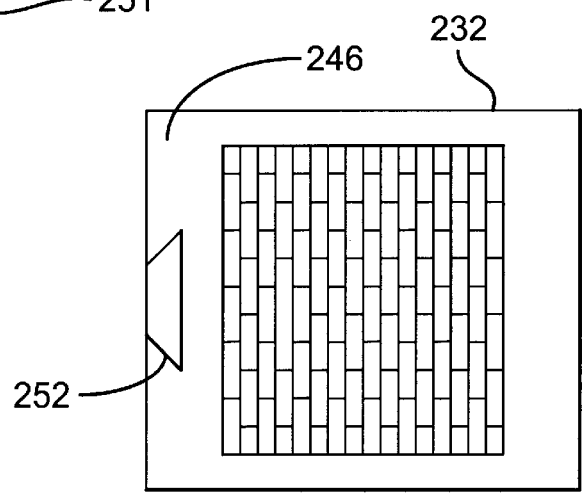
FIG. 16D is a top view of a screen for use in a screen combination as in FIG. 16A.

FIGS. 16C and 16D illustrate optional embodiments for the screens 231, 232. As shown in FIG. 16C the shoulder 237 of the screen 231 has a recess 251 formed in the shoulder. A positioning member 252 projects upwardly from the top of the shoulder 246 of the screen 232. The positioning member 252 is sized, shaped, positioned and configured for receipt within the recess 251 to facilitate correcting positioning of the screen 232 with respect to the screen 231. A screen according to the present invention may have both a recess as the recess 251 and a positioning member as the member 252.

FIGS. 17A and 17B illustrate a screen combination 260 according to the present invention which includes a first screen 261 and a second screen 262 according to the present invention. The screens 261, 262 each have, respectively, a frame 263, 264 which are substantially identical. The frame 263 has a top 265 and shoulders 266, 267 that project from a base 268. Screening material 269 (any disclosed herein) is over an opening 270 through the frame 263. Alternatively the frame itself may have a pattern or series of openings therethrough (any desired or referred to herein) over which screening material is placed. Any two similar screens according to the present invention may be used instead of the screens 231, 232.

As shown in FIG. 17A a shoulder 276 of the screen 262 (like the shoulder 266) is positioned beneath the shoulder 267 of the screen 261. The screen 262 has screening material 289 thereon. Preferably the shoulder 276 sealingly contacts the shoulder 267 along its length. The screen 262 also has a shoulder 277 and a base 278. The positioning illustrated in FIG. 17A is the positioning the screens have in the basket of certain vibratory separators. Any shape disclosed herein may be used for the shoulders and any seal or seal member or members disclosed herein may be used thereon.

Figure 17D:
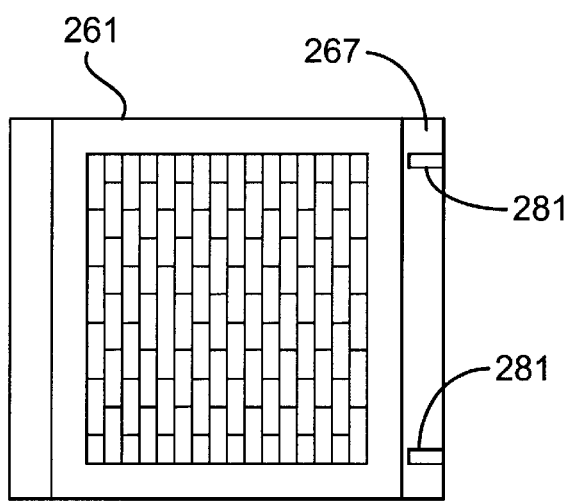
FIG. 17D is a top view and FIG. 17E is a bottom view of screens for use in a screen combination as in FIG. 17A.
Figure 17E:
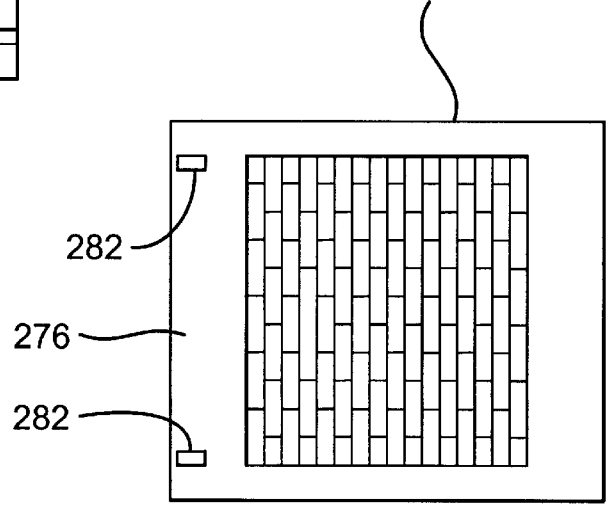
Figure 17C:
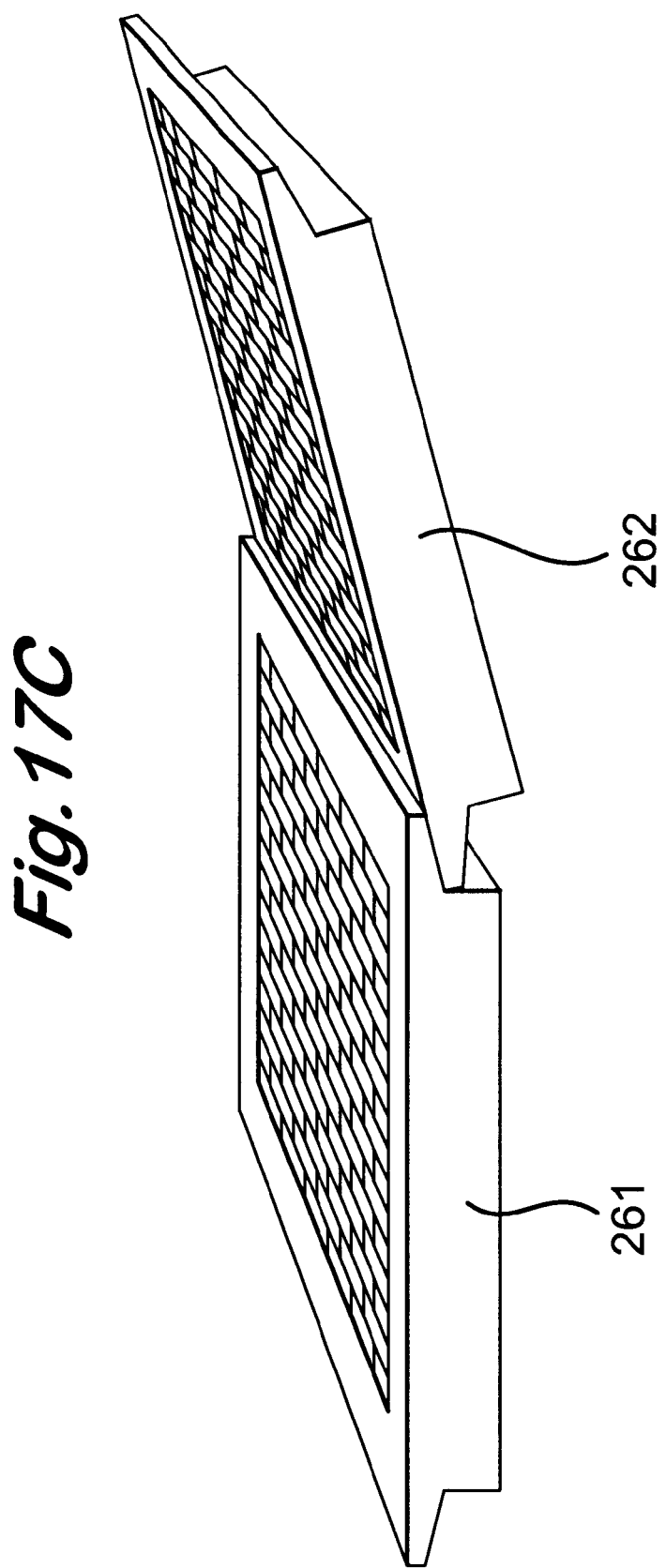
FIGS. 17C is a bottom view of a screen for use in a screen combination as in FIG. 17A.

FIG. 17C shows the screen 262 being placed into position with respect to the screen 261.

FIGS. 17D and 17E illustrate optional embodiments for the screens 261, 262. As shown in FIG. 17D the shoulder 267 of the screen 261 has recesses 281 formed in the shoulder. positioning members 282 project upwardly from the top of the shoulder 276 of the screen 262. The positioning members 282 are sized, shaped, positioned and configured for receipt within the recesses 281 to facilitate correcting positioning of the screen 262 with respect to the screen 261. A screen according to the present invention may have both recesses as the recesses 281 and positioning members as the members 282.

The present invention, therefore, in some, but not necessarily all embodiments, provides a screen assembly for a vibratory separator, the screen assembly with a first screen assembly, a frame to which is mounted screening material, at least one seal member on the frame for sealing contact against a second screen assembly. Such a method may include one or some of the following, in any possible combination: the first screen assembly's frame having a groove for receiving a tongue of the second screen assembly; wherein the at least one seal member is within the groove and the tongue of the second frame is positionable with a part thereof in sealing contact with the at least one seal member; the second screen assembly; the second screen assembly having a tongue with a recess therein for receiving a portion of the at least one seal member; wherein the at least one seal member is two spaced-apart seal members; wherein each of the two spaced-apart seal members is in the groove; wherein the first screen assembly has an end portion and wherein the at least one seal member further comprises a channel-shaped member partially encompassing part of the end portion of the first screen assembly; wherein the channel-shaped member has a bead projecting therefrom and the end portion of the first screen assembly has a correspondingly-shaped recess for receiving said bead for facilitating emplacement of the at least one seal member on the end portion of the first screen assembly; wherein the first screen assembly has an end portion with a notch therein and the at least one seal member has a correspondingly-shaped portion for receipt within said notch to hold the at least one seal member to the first screen assembly; wherein the at least one seal member is secured to the first screen assembly with at least one fastener; the first screen assembly's frame having a tongue projecting from one end thereof, the tongue for abutting a part of the second screen assembly, and at least one seal member on the tongue for sealingly contacting the part of the second screen assembly; a perforated plate secured to the frame (of either the first screen, second screen, or both screens), and the screening material on the perforated plate; wherein the part of the second screen assembly is a groove and the tongue is positionable with the at least one seal member in sealing contact with the groove; the second screen assembly's groove with a recess therein for receiving a portion of the at least one seal member; wherein the at least one seal member is two spaced-apart seal members, each in the groove; wherein the first screen assembly's tongue has a notch therein and the at least one seal member has a correspondingly-shaped portion for receipt within said notch to hold the at least one seal member to the first screen assembly; wherein the at least one seal member is attached to the frame; and/or wherein the at least one seal member is formed of the frame.

The present invention, therefore, in some, but not necessarily all embodiments, provides a unibody structure for a first screen assembly for a vibratory separator, the unibody structure having an integral body member with a portion having a plurality of spaced-apart openings therethrough defining a pattern of a plurality of spaced-apart screening openings, the integral body member including side portions foldable to form a pair of spaced-apart integral side members, and at least one seal member on (attached to or formed of) the integral body member for sealing contact of the unibody structure with another item; and wherein the another item is a second screen assembly.

The present invention, therefore, in some, but not necessarily all embodiments, provides a unibody structure for a first screen assembly for a vibratory separator, the unibody structure with an integral body member having four sides, including two pairs of spaced-apart sides, and a portion having a plurality of spaced-apart openings therethrough defining a pattern of a plurality of spaced-apart strips, the integral body member including at least two side portions at one of the two pairs of spaced-apart sides foldable to form a pair of spaced-apart integral side members, and at least one seal member on (attached to or formed of) the integral body member for sealing contact of the unibody structure with another item; and wherein the another item is a second screen assembly.

The present invention, therefore, in some, but not necessarily all embodiments, provides a unibody structure for a first screen assembly for a vibratory separator, the unibody structure with an integral body member with a central cut-out portion, the integral body member including side portions foldable to form two pairs of spaced-apart integral side members, and at least one seal member on the integral body member for sealing contact of the unibody structure with another item; and wherein the another item is a second screen assembly.

The present invention, therefore, in some, but not necessarily all embodiments, provides a frame for a first screen assembly for a vibratory separator, the frame having interconnected frame sides, and at least one seal member on at least one of the frame sides for sealingly contacting a second screen assembly; and wherein the at least one seal member extends along substantially an entire length of one of the frame sides.

The present invention, therefore, in some, but not necessarily all embodiments, provides a frame for a filtering screen, the frame being of rectangular shape and having opposed ends whose sections transverse to the frame are respectively of a tongue and a groove configuration, so that when in abutting relationship with a second frame the tongue of one frame enters the groove of the next frame, forming a seal along the respective ends past which the material to be filtered is prevented from passing, and at least one seal member on the frame for sealingly contacting the second frame; and wherein the frame has interconnected sides and the at least one seal member extends along substantially an entire length of one of the sides.

The present invention, therefore, in some, but not necessarily all embodiments, provides a frame combination for use in a vibratory separator apparatus, the frame with a first screen with two spaced-apart first screen shoulders, a second screen with two spaced-apart second screen shoulders, and the screens in end-to-end abutting contact with a top surface of one of the two spaced-apart second screen shoulders sealingly contacting a bottom surface of one of the two spaced-apart first screen shoulders; and mating positioning apparatus on the screens for facilitating positioning of the screens with respect to each other.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in § 102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A unibody structure for a screen assembly for a vibratory separator, the unibody structure comprising
    an integral body member with a portion having a plurality of spaced-apart openings therethrough defining a pattern of a plurality of spaced-apart screening openings, and
    the intergral body member including a pair of spaced-apart integral side members comprising side portions folded to form the pair of spaced-apart members, and
    a pair of spaced-apart integral end members comprising end portions folded to form the spaced-apart integral end members, the pair of spaced apart intergral end member and a second end member,
    wherein the first end member is configured with a shoulder portion adapted to sealing abut a screen ledge end of an adjacent screen,
    wherein the second end member is configured with a ledge portion adapted to sealing abut a shoulder portion of an end of an adjacent screen, and
    at least one member on at least one of the shoulder support portion and ledge portion for sealing contact of the unibody structure with a second screen assembly.

2. The unibody structure of claim 1 wherein the at least one seal member is a first seal member and a second seal member, the first seal member on the shoulder support portion and the second seal member on the ledge portion.

3. A screen assembly for a vibratory separator, the screen assembly comprising
    an integral body member with a portion having a plurality of spaced-apart openings therethrough defining a pattern of a plurality of spaced-apart screening openings, and
    the integral body member including a pair of spaced-apart integral side members comprising side portions folded to form the pair of spaced-apart integral side members, and
    a pair of spaced-apart integral end members comprising end portions folded to form the pair of spaced-apart integral end members, the pair of spaced-apart integral end members including a first end member and a second end member,
    wherein the first end member is configured with a shoulder support portion adapted to sealing abut a screen ledge end of an adjacent screen,
    wherein the second end member is configured with a ledge portion adapted to sealing abut a shoulder portion of an end of an adjacent screen,
    at least one seal member on at least on of the shoulder support portion and ledge portion for sealing contact of the unibody structure with a second screen assembly, and
    screening material over the plurality of spaced-apart screen openings.

4. Assembly for a vibratory separator, the screen assembly comprising
    a first screen assembly and a second screen assembly,
    said first screen assembly having a first frame and said second screen assembly having a second frame,
    screening material on each frame,
    the first frame having a groove for receiving and encompassing a portion of a tongue of the second screen assembly, the second frame having said tongue receivable in the groove of the first frame, said tongue having a portion that projects into the groove of the first frame,
    at least one seal member on at least one of the first frame and the tongue of the second frame, the at least one seal member for sealing an interface between the the the first frame and second frame,
    wherein the first screen assembly has an end portion and wherein the at least one seal member further comprises a channel-shaped member partially encompassing pat of the end portion of the first screen assembly, and
    wherein the channel-shaped member has a bead projecting therefrom and the end portion of the first screen assembly has a correspondingly-shaped recess for receiving said bead for facilitating emplacement of the at least one seal member on the end portion of the first screen assembly.

5. The screen assembly of claim 4 wherein the at least one seal member is within the groove and the tongue of the second frame is positionable with a part thereof in sealing contact with the at least one seal member.

6. The screen assembly of claim 4 wherein the at least one seal member is two spaced-apart seal members.

7. The screen assembly of claim 6 wherein each of the two spaced-apart seal members is in the groove of the first frame.

8. The screen assembly of claim 6 wherein each of the two spaced-apart seal members is on the tongue of the second frame.

9. The assembly of claim 4 wherein the first frame has an end portion with a notch therein and the at least one seal member has a correspondingly-shaped portion for receipt within said notch to hold the at least one seal member to the first screen assembly.

10. The screen assembly of claim 4 wherein the at least one seal member is secured to the first frame with at least one fastener.

11. The screen assembly of claim 4 further comprising
    the first screen assembly further comprising
        the first frame having a tongue projecting from one end thereof, the tongue for abutting a part of mounting structure to which the screen assembly is to be mounted.

12. The screen assembly of claim 4 further comprising a perforated plate secured to the first frame, and screening material on the perforated plate.

13. The screen assembly of claim 4 further comprising a perforated plate secured to the second frame, and screening material on the perforated plate.

14. The screen assembly of claim 4 wherein the second frame's tongue has a notch therein and at least one seal member has a correspondingly-shaped portion for receipt within said notch to hold the at least one seal member to the tongue.

15. The screen assembly of claim 4 wherein the at least one seal member is formed of the first frame.

16. The screen assembly of claim 4 wherein the at least one seal member is formed of the tongue of the second frame.

* * * * *